(12) United States Patent
Irie et al.

(10) Patent No.: US 11,710,059 B2
(45) Date of Patent: Jul. 25, 2023

(54) ISING SOLVER SYSTEM

(71) Applicants: DENSO CORPORATION, Kariya (JP); Toyota Tsusho Corporation, Tokyo (JP)

(72) Inventors: Hirotaka Irie, Kariya (JP); Akira Miki, Kariya (JP); Masayoshi Terabe, Kariya (JP); Toru Awashima, Tokyo (JP); Shunsuke Takahashi, Tokyo (JP); Wongpaisarnsin Goragot, Bangkok (TH); Shiowattana Dungjade, Bangkok (TH)

(73) Assignees: DENSO CORPORATION, Kariya (JP); TOYOTA TSUSHO CORPORATION, Tokyo (JP)

( * ) Notice: Subject to any disclaimer, the term of this patent is extended or adjusted under 35 U.S.C. 154(b) by 454 days.

(21) Appl. No.: 16/816,431

(22) Filed: Mar. 12, 2020

(65) Prior Publication Data
US 2020/0293939 A1    Sep. 17, 2020

(30) Foreign Application Priority Data

Mar. 14, 2019    (JP) .................................. 2019-046797

(51) Int. Cl.
*G06N 10/00* (2022.01)
*G08G 1/0968* (2006.01)
*G06Q 10/047* (2023.01)

(52) U.S. Cl.
CPC ........... *G06N 10/00* (2019.01); *G06Q 10/047* (2013.01); *G08G 1/096844* (2013.01)

(58) Field of Classification Search
CPC ...... G06N 10/00; G06N 5/003; G06Q 10/047; G08G 1/096844
See application file for complete search history.

(56) References Cited

U.S. PATENT DOCUMENTS

2019/0164418 A1\*    5/2019    Neukart ............... G08G 1/0129

OTHER PUBLICATIONS

Taichi Itoh (BrainPad Inc.), Mitsuhisa Ohta (BrainPad Inc.), Yuichi Yamasaki (BrainPad Inc.), and Shu Tanaka (Waseda University and JST, Presto). "Quantum annealing for combinatorial optimization problems with multiple constraints". 2017.
Andrew Lucas. "Ising formulations of many NP problems". Harvard University, Cambridge, MA, USA. Jan. 27, 2014. pp. 1-27.
(Continued)

*Primary Examiner* — Yuen Wong
(74) *Attorney, Agent, or Firm* — Posz Law Group, PLC

(57) ABSTRACT

An ising solver system that searches an optimal route of a vehicle from plural routes passing through plural locations. In the ising solver system, the search of the optimal route uses a Hamiltonian. The Hamiltonian includes an equation representing an interaction between Quadratic Unconstrained Binary Optimization (QUBO) variables depending on a relation between a departure location and an arrival location or capacitated variable of the ising solver. The capacitated variable corresponds to one of the QUOBO variables and includes a variable constraint, and the location-to-location travel step number corresponds to an accumulated movement time of the vehicle.

23 Claims, 19 Drawing Sheets

(56) References Cited

OTHER PUBLICATIONS

Hirotaka Irie, Goragot Wongpaisarnsin, Masayoshi Terabe, Akira Miki, and Shinichirou Taguchi "Quantum Annealing of Vehicle Routing Problem with Time, State and Capacity". Mar. 15, 2019. pp. 1-12.

Richard H. Warren. "Small Traveling Salesman Problems". Journal of Advances in Applied Mathematics, vol. 2, No. 2 Apr. 2017. pp. 101-107.

Sebastian Feld, Thomas Gabor. "Project QASAR Results and hands-on demonstration of a joint project of Volkswagen and LMU". Qubits Europe 2018. D-Wave Users Conference. Apr. 12, 2018, Munich, Germany.

* cited by examiner (a)

(b)   (c)

(a)

(A PART IS DISPLAYED)

ISING SOLVER SYSTEM

CROSS REFERENCE TO RELATED APPLICATION

The present application claims the benefit of priority from Japanese Patent Application No. 2019-46797 filed on Mar. 14, 2019. The entire disclosure of the above application is incorporated herein by reference.

TECHNICAL FIELD

The present disclosure relates to an ising solver system for extracting an optimal solution by using an ising solver.

BACKGROUND

Traveling salesman problem (TSP) and vehicle routing problem (VRP) are mathematical models that calculate the shortest route (a route with the least cost). These are NP-hard problems, and fundamental problems having various application possibilities such as "planning", or "microchip design". In order to solve TSP or VRP by using an ising type solver, a formulation of a QUBO format (quantum algorithm) is required. As the formulation of the QUBO format, a method as a comparative example has been known.

In the application of the TSP or the VRP, not only a simple shortest route calculation but also many optimization problems simultaneously including multiple constraints have been known. In order to expand an application range, it may be important to develop a method for solving the problems. Here, the VRP may be also referred to as multiple traveling salesman problem (multiple-TSP) in which multiple simultaneous traveling routes are searched. Accordingly, in the present disclosure, the term of VRP may be also used as a generic concept including the multiple-TSP. In order to distinguish the multiple route searches, a term of "vehicle" commonly used in the VRP may be used.

SUMMARY

In an ising solver system, change of a capacitated variable in an ising solver is able to be described by introducing an interaction between QUBO variables depending on a relation between a departure point of a first city among multiple cities and an arrival point of a second city among the multiple cities, and a concept of an inter-city travel step number for travel between the multiple cities is expressed by describing the change.

BRIEF DESCRIPTION OF DRAWINGS

FIG. 8 is a diagram describing a consumption cell number constraint according to the embodiment of the present disclosure;

FIG. 9 is a diagram describing allowance or rejection of an arrival according to the present embodiment of the present disclosure;

FIG. 10 is a diagram describing an embodiment 1 according to the present embodiment of the present disclosure;

DETAILED DESCRIPTION

Figure 1:
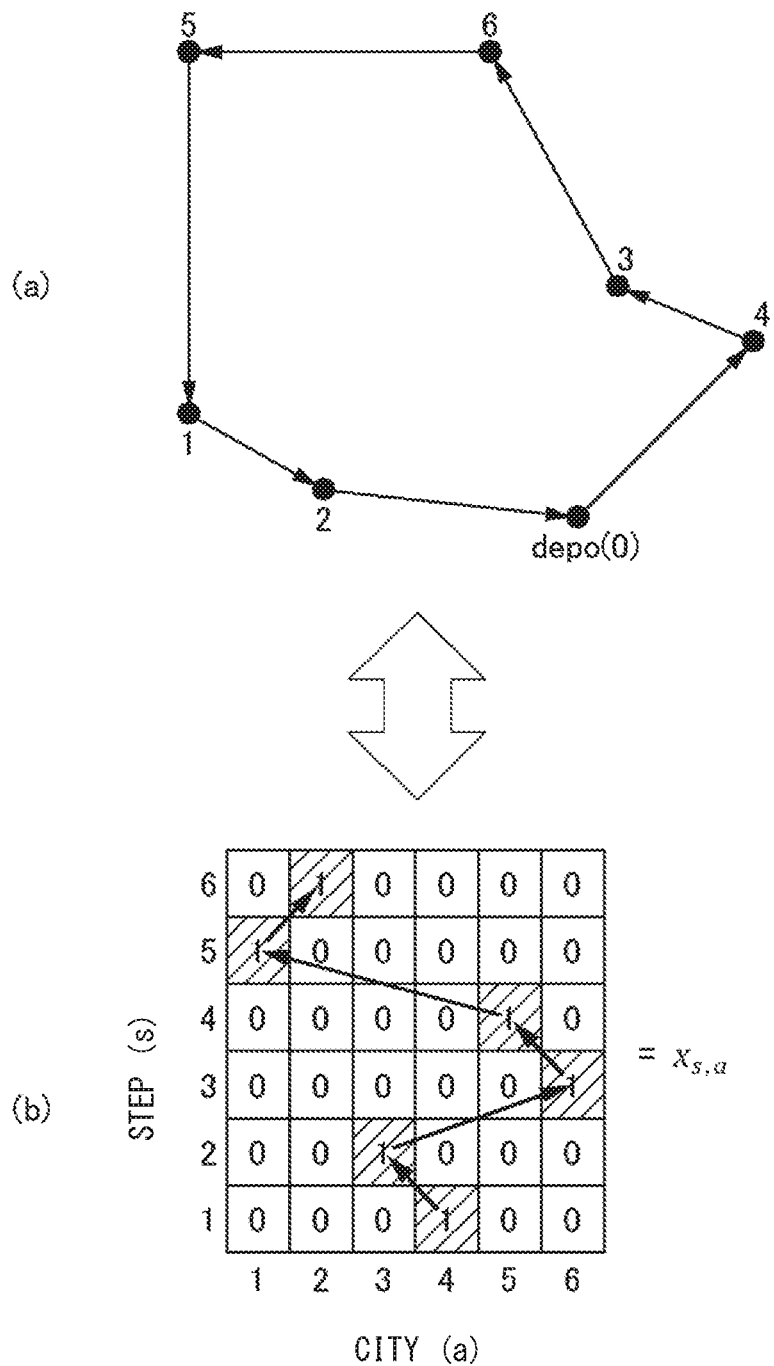
FIG. 1 is a diagram showing an example of a process of a conventional ising type solver system (shown in Non-Patent Literature 1)

One of difficulties for solving the TSP or the VRP by using the conventional ising type solver is that the ising type solver is specialized in the simple shortest route calculation for the TSP or the VRP and cannot deal with the TSP or the VRP including the more realistic constraints. The TSP constrains or the VRP constrains that is particularly important in application includes, for example, a case (TSP/VRP with time-window) where a time zone to visit each city is limited. Furthermore, the TSP constrains or the VRP constrains include constrain problem (capacitated TSP/VRP, in other words, CTSP/CVRP) in which the shortest route that falls within a limit of a quantitative variable is searched when each vehicle has the quantitative variable and the limit and when, every time that each vehicle visits each city, the quantitative variable increases or decreases depending on the visited city. Hereinafter, the quantitative variable having this capacity constraint may be also referred to as a "capacitated variable". The problem having the capacity constraint may be simply referred to as "having the capacity". The capacitated variable may be simply referred to as the "capacity".

In the system using the conventional ising type solver, a QUBO formulation on an assumption that one travel is regarded as one step is employed. Due to this, it may not be possible to solve an optimal route search problem in consideration of time and capacity other than TSP or VRP for finding the simple shortest route.

One example of the present disclosure provides a solver system of the TSP or the VRP capable of dealing with the optimal route search problem in consideration of time and capacity by adding a new type of interaction.

In one example, QUBO variables representing the concept of consumption step number, a capacity, or a state in accordance with travel between cities are introduced, and a repulsive interaction between the QUBO variables for controlling the inter-city travel is introduced. Thereby, it may be possible to describe the accumulation of the consumption step number, the capacitated variable, or the change.

According to one example embodiment, in an ising solver system, multiple cities may include a first city and a second city. By introducing an interaction between the QUBO variables depending on a relation between a departure point of the first city and an arrival point of the second city, a concept of an inter-city travel step number or change of a capacitated variable in an ising solver can be described.

That is, a formulation method for introducing the concept of time or capacity for VRP and TSP into the ising QUBO format is provided by introducing a dynamic penalty term, as a repulsive interaction depending on the departure point and the arrival point, in other words, the interaction, based on the inter-city relation.

In the ising solver system described above, the number of steps of inter-city travel may include a time point. That is, it may be possible to formulate TSP or VRP including a timetable for describing a required time by using the dynamic penalty term based on the inter-city relation.

In the ising solver system described above, an inter-city travel step number of the ising solver may include the capacitated variable that monotonically increases or decreases. That is, it may be possible to formulate the TSP or the VRP including a table for describing the monotonically increasing or decreasing capacitated variable by using a dynamic penalty term based on a relation between the cities.

In the ising solver system described above, the capacitated variable of the ising solver may include a capacitated variable that is associated with an arrival city and is able to change positively or negatively. That is, the ising solver system includes the timetable or the capacitated variable that monotonically increases or decreases. Furthermore, the capacity-qubits newly describing the capacitated variable are introduced. In this state, it may be possible to formulate CTSP or CVRP including an accumulation limit of at least one capacitated variable allowed to positively or negatively increase or decrease by using the dynamic penalty term based on the relation between the cities. Thereby, for example, within the constraint that strictly falls in the range of the capacity, it may be possible to formulate CTSP or CVRP having one or multiple capacities so as to simultaneously perform the deliver and the pickup.

In the ising solver system described above, the capacitated variable allowed to positively or negatively increase or decrease may include a state variable. That is, one of the capacity-qubits is interpreted as a state qubit, and it may be possible to formulate CTSP or CVRP in which the state variable changes for each inter-city travel by using the dynamic penalty term based on the inter-city relation. Thereby, for example, it may be possible to formulate CTSP or CVRP in which the next travel rule changes depending on each state.

In the ising solver system described above, an inter-city travel step number of the ising solver may include a time point. Furthermore, the capacitated variable of the ising solver may include addition of positive change or negative change of a capacity associated with an arrival city and a state variable.

In the ising solver system described above, the inter-city travel step number of the ising solver may include the capacitated variable that monotonically increases or decreases.

In the ising solver system described above, a city that cannot be reached may be set by introducing the interaction. That is, when it is impossible to arrive at a city (a) from a city (b), it may be possible to perform setting of forbidding the arrival by introducing the dynamic penalty term based on the relation between the cities. Thereby, it may be possible to forbid the direct travel between the cities that cannot be reached without passing through the other cities, for example, like optimization of bus traveling routes.

In the ising solver system described above, a basic constraint and a parameter may be set by introducing the interaction. That is, the parameter that satisfies coastline conditions for optimizing a solution acquisition efficiency may be set by introducing the interaction of a QUBO-Hamiltonian.

In the ising solver system described above, a cost of the ising solver may depend on the time point or the capacitated variable that monotonically increases or decreases. That is, it may be possible to perform formulation so that the necessary cost and the consumption cell number change in accordance with each departure time or the current amount of the monotonically increasing or decreasing capacitated variable. Thereby, it may be possible to set, for example, a flexible rest time, a stay time, and a required time that differs depending on each departure time.

In the ising solver system described above, the schedule time unit of the timetable of the ising solver may have the time point dependency.

In the ising solver system described above, the schedule time unit of the timetable in the ising solver may have a vehicle type dependency.

In the ising solver system described above, the inter-city travel step number may be different from the cost. That is, it may be possible to set the inter-city cost and the consumption cell independently of each other. Thereby, for example, in a refrigerated delivery or a delivery of raw items or the like, it may be possible to set a priority delivery by inputting a shorter route distance than an actual travel distance.

In the ising solver system described above, an arrival allowance to arrive at the city may be set in accordance with the time point of the ising solver or the capacitated variable monotonically increasing or decreasing. That is, the arrival at the city may be allowed or rejected in accordance with each arrival time point or the monotonically increasing or decreasing capacitated variable. Thereby, for example, it may be possible to designate a time zone for the delivery, and set, for one customer, multiple deliverable time zones which are separated from each other.

In the ising solver system described above, the time point of the ising solver or a range of the monotonically increasing or decreasing capacitated variable differs for each vehicle.

Thereby, for example, it may be possible to set a working time constraint for each driver.

In the ising solver system described above, the multiple vehicles may not visit the same (or identical) city when the time point of the ising solver for each of the vehicles or the capacitated variable monotonically increasing or decreasing for each of the vehicles is in the same range. That is, a mutually exclusive setting may be set so that, although any two vehicles do not visit the same city within a range of the same time point or the same capacitated variable, the arrival in accordance with the different time zones or the different capacitated variables is allowed. Thereby, it may be possible to describe CVRP in which, for example, each vehicle does not visit the same city in the same time zone although each vehicle visits all cities.

In the ising solver system described above, the arrival allowance of a specific vehicle for arriving at some cities or the rejection of the specific vehicle for arriving at some cities may be set. That is, the specific vehicle may be selectively allowed or rejected to arrive at the city. Thereby, for example, in a case where the type of delivery vehicle is limited such as a case where a width of the delivery vehicle exceeds a road width or a delivery capacity of the vehicle exceeds the limit, it may be possible to select the type of vehicle for a delivery destination.

In the ising solver system described above, the interaction may include an interaction that generates a tendency for equally assigning a variable associated with each of multiple cities to each vehicle. That is, at least one quantitative variable is assigned to the city, and the introduction of the interaction that generates the tendency equally assigning any of at least one quantitative variable to each vehicle may be performed. Thereby, it may be possible to simulatively set a limit of capacity or weight, for example, by generating the tendency that performs equal distribution although the tendency does not correspond to the strict capacity range.

Hereinafter, embodiments of the present disclosure will be described with reference to the drawings. The embodiments described below show an example in the case of practicing the present disclosure, and the present disclosure is not limited to the specific configuration described below. In the implementation of the present disclosure, a specific configuration according to the embodiments may be adopted as appropriate.

Hereinafter, first, an overview of a system according to the present embodiment will be described while difficulties of a conventional technology will be described. Non-Patent Literature 1 of "Lucas, "Ising formulation of many NP problems", Front. Phys. 2, A5 (2014)" is incorporated herein by reference. Furthermore, Non-Patent Literature 2 of "Itoh-Ohta-Yamasaki-Tanaka, "Quantum annealing for combinatorial optimization problems with multiple constraints", Adiabatic Quantum Computing Conference 2017, Jun. 26-29, 2017, GranTokyo South Tower, Tokyo, Japan" is incorporated herein by reference.

FIG. 1 is a diagram showing an example of a process of a conventional ising type solver system (shown in Non-Patent Literature 1). In this example, a relative traveling distance from a city (b) to a city (a) is defined as $d_{ab}$, and the shortest route in which each of N cities is visited once is calculated. The $d_{ab}$ is a cost of travel, and it is generally considered that the $d_{ab}$ is not a distance. As a variable representing a traveling route of cities shown in a part (a) of FIG. 1, QUBO variables (hereinafter, also referred to as "qubits") shown in a part (b) of FIG. 1 are prepared. As shown in an expression1, whether to visit the city (a) in a step (s) is represented by 0 or 1 of the QUBO variable.

[Expression 1]

$$x_{s,a}=1(\text{visit}); x_{s,a}=0(\text{not visit}) \quad (1)$$

In this way, an optimal solution can be obtained by minimizing a Hamiltonian that is a cost function under variable constraints of an expression 2.

[Expression 2]

$$\mathcal{H}_0 = \sum_{s=1}^{N-1} \sum_{a \neq b} d_{ab} x_{s+1,a} x_{s,b} + \sum_{a=1}^{N} d_{a0}(x_{1,a} + x_{N,a}) \left( \text{with } \sum_{s=1}^{N} x_{s,a} = 1 \ (\forall a), \sum_{a=1}^{N} x_{s,a} = 1 \ (\forall s) \right) \quad (2)$$

Furthermore, as shown in an expression 3, constraint terms are grouped into one Hamiltonian in the form of a square.

[Expression 3]

$$\mathcal{H} = \beta \left[ \sum_{s=1}^{N-1} \sum_{a \neq b} d_{ab} x_{s+1,a} x_{s,b} + \sum_{a=1}^{N} d_{a0}(x_{1,a} + x_{N,a}) \right] + \lambda_1 \sum_{a=1}^{N} \left( \sum_{s=1}^{N} x_{s,a} - 1 \right)^2 + \lambda_2 \sum_{s=1}^{N} \left( \sum_{a=1}^{N} x_{s,a} - 1 \right)^2 \quad (3)$$

Here, the square is formed for causing a penalty due to the square when the constraint terms are not satisfied.

This conventional system or method has the following difficulties. A first difficulty is that it is not possible to describe the concept of time point related to a traveling time or a time change. That is, when the TSP or the VRP having the time-window is considered, the concept of time point is required. However, the conventional technology described above cannot deal with the concept of time. Although it may be considered that the step number (s) is regarded as time, the travel requires time. A time point of a city after the travel in one step is generally different. Therefore, the step number (s) is not possible to represent the time point. The step number may be also regarded to as a numerical number of steps. Furthermore, the step number for the travel between the cities may be also referred to as an inter-city travel step number. Hence, it is not possible to describe the time change of the inter-city cost $d_{ab}$ of TSP or VRP or the like.

In the present embodiment, a new method of introducing the concept of time point by introducing a new type of interaction is proposed. According to a system of the present embodiment, it may be possible to formulate various constraints related to time. According to the system of the present embodiment, it may be possible to formulate the CTSP or the CVRP by regarding the time point as the capacitated variable monotonically increasing or monotonically decreasing.

A second difficulty is that there is no method for describing the CTSP (capacitated TSP) or the CVRP (capacitated VRP) having the capacity. As an advance of Non-Patent Literature 1, in Non-Patent Literature 2, it is attempted to have the capacity monotonically increasing in the form of a square formulation of an inequality constraint. However, the interaction may not be extremely complicated and the attempt may not be versatile. When the formulation is successful, execution in a large size can be provided by using a simulated annealing (SA) method. However, actually, even when the SA is used, only CVRP with 4 cities and 1 depo (and 2 vehicles) has been successful. In the conventional technology, it is not possible to describe the CTSP or the CVRP that allows the capacity to increase or decrease in the traveling route.

In the present embodiment, by applying the new interaction method, a large number of capacity limitations are simultaneously imposed. A new method related to the formulation of the CTSP or the CVRP that allows the capacity to increase or decrease in the traveling route is proposed.

A third difficulty is that multiple cell constraint terms reduce the probability. That is, it has been known that, in the conventional formulation of the TSP or the VRP, the large number of cell constraint terms are generally introduced. However, it has been known that, in the conventional method, the probability of finding the optimal solution decreases as the number of terms increases.

Therefore, in the present embodiment, a new method related to the introduction of the constraint term for avoiding the probability decrease described above, that is, a new method related to a parameter setting method for increasing the probability of the TSP or the VRP having the large number of constraint terms is proposed.

A fourth difficulty is that an action schedule does not have the diversity. In the actual applications, not only the description of the inter-city travel but also various descriptions such as a stay in the city may be required. However, in the conventional technology, only the travel is focused, and it is not possible to describe whether to perform the travel or spend time for staying in the city.

In the present embodiment, a new method of formulating the CTSP or the CVRP is proposed. In the new method, multiple states are added to the vehicle by applying the new interaction method, and the cost in accordance with a state or a traveling rule is described.

Hereinafter, the system according to the present embodiment of the present disclosure will be specifically described. In the present embodiment, the following three characteristic points will be described.

(First Point)

Figure 2:
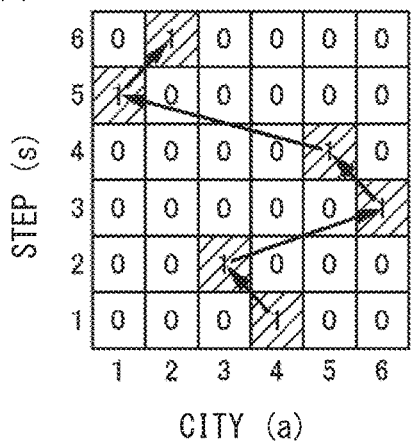
FIG. 2 is a diagram describing a first point according to an embodiment of the present disclosure.
Figure 2:
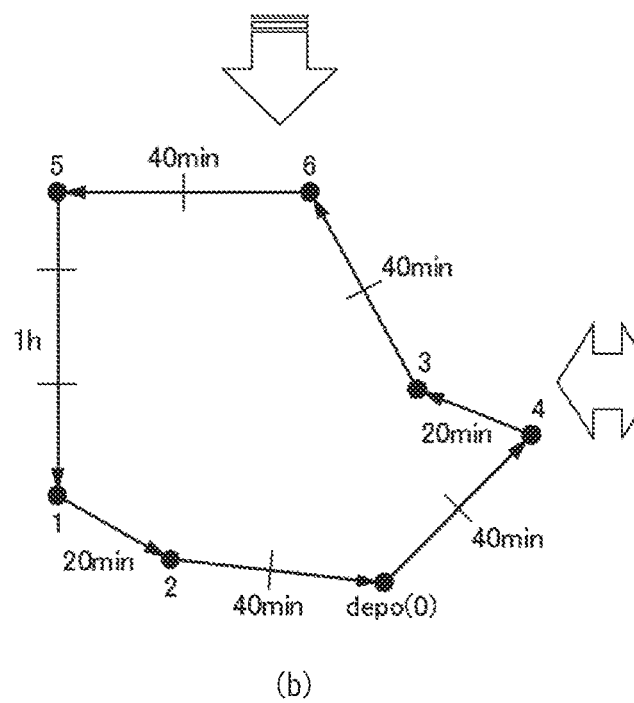

A first point is a method of performing a new QUBO formulation of the CTSP or the CVRP by introducing a dynamic penalty term based on an inter-city relation. FIG. 2 is a diagram describing the first point according to the embodiment of the present disclosure. In the present embodiment, when the conventional TSP formulation is that shown in a part (a) of FIG. 2, a required time that differs depending on a distance is added as shown in a part (b) of FIG. 2, a time table is generated as shown in a part (c) of FIG. 2, and formulation is performed by an expression 4.

[Expression 4]

$$\sum_{\delta t=1}^{n_{ab}^{(t)}-1} \lambda \times x_{t+\delta t,a}^{(i)} x_{t,b}^{(i)} \quad (\forall\, a \neq \forall\, b, \forall\, t, \forall\, i, \text{ if } n_{ab}^{(t)} > 1) \quad (4)$$

By introducing the new interaction method, as a one-cell jump 21 or a two-cell jump 22 shown in the part (c) of FIG. 2, it may be possible to express a cell jump in accordance with an inter-city situation. It may be possible to introduce a timetable in the QUBO formulation of the TSP or the VRP.

Thereby, it may be possible to use the constraint that is not possible with conventional formulation. Specifically, the time window can be described. The time change of the inter-city cost can be described. The various constrains related to the time point can be performed. The CTSP or the CVRP can be described by replacing the concept of time with a general concept of capacity.

(Second Point)

Figure 3:
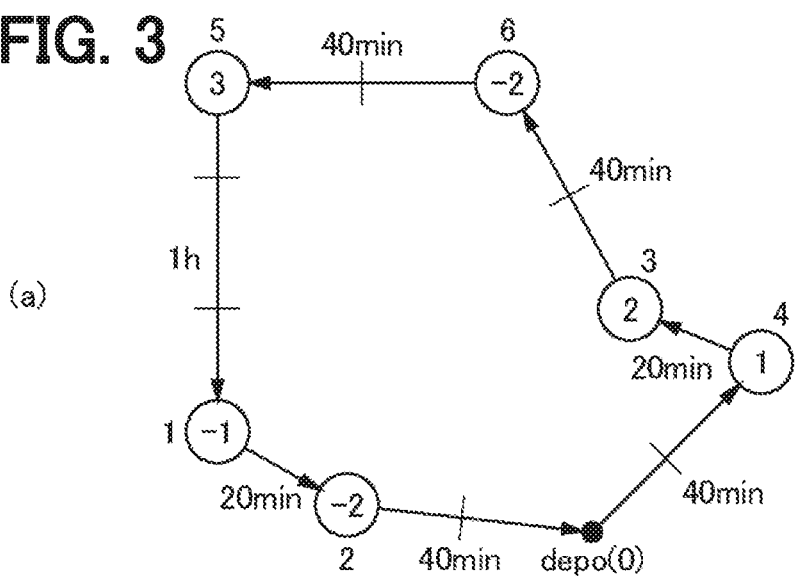
FIG. 3 is a diagram describing a second point according to the embodiment of the present disclosure.
Figure 3:
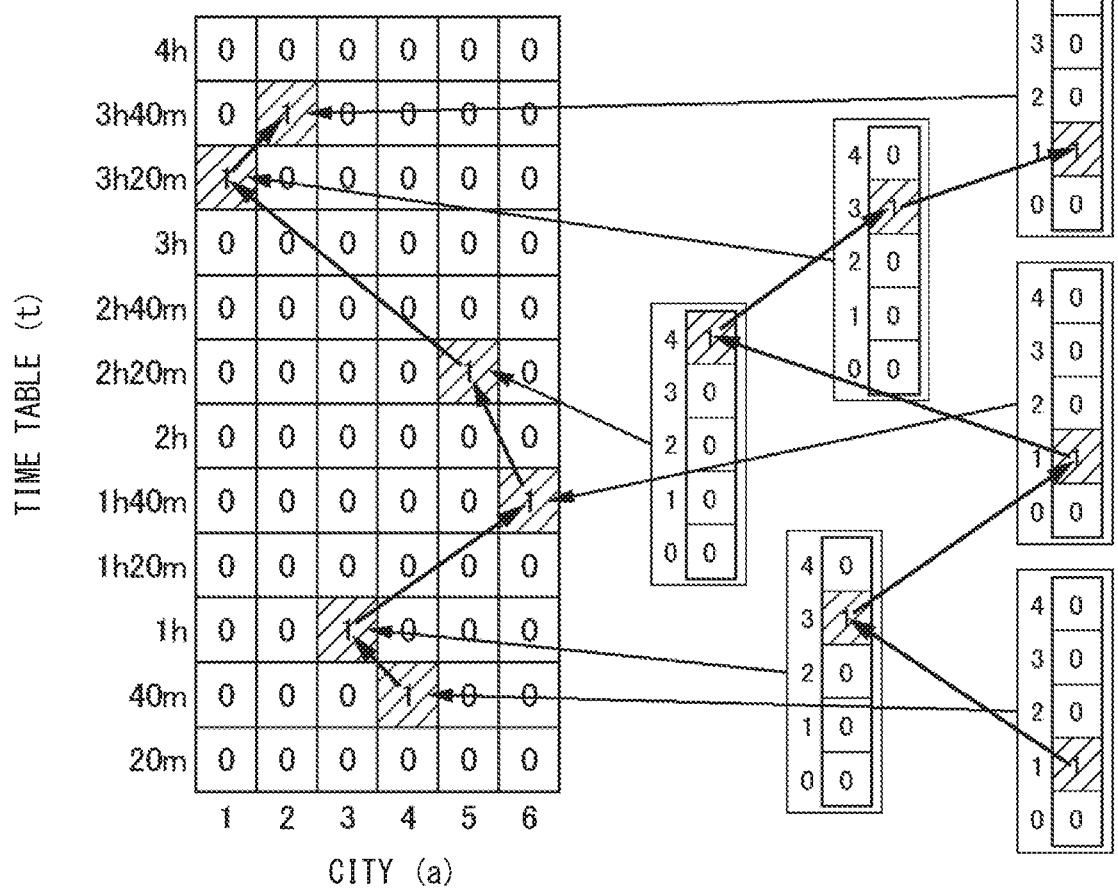

A second point is a method of describing multiple-capacity by applying the dynamic penalty term based on the inter-city relation. FIG. 3 is a diagram describing the second point according to the embodiment of the present disclosure. In the present embodiment, in addition to the first point, the increase or decrease of the capacitated variable is furthermore added to each city. In a part (a) of FIG. 3, a loading limit of the vehicle is set to 0 to 4. In the present embodiment, formulation is performed as shown in a part (b) of FIG. 3. A new capacity-QUBO variable is introduced as shown in a part (C) of FIG. 3.

Thereby, it may be possible to express the jump between the capacity-QUBO variables by applying the similar idea to the first point and introducing the interaction in accordance with the inter-city situation. That is, by applying the new interaction method to the newly introduced capacity-QUBO variable, it may be possible to formulate the new CTSP or the new CVRP. Thereby, it may be possible to describe CTSP or CVRP that satisfies the multiple capacity limits while the increase or the decrease is allowed during the travel, the increase or the decrease being not conventionally possible.

(Third Point)

Figure 4:
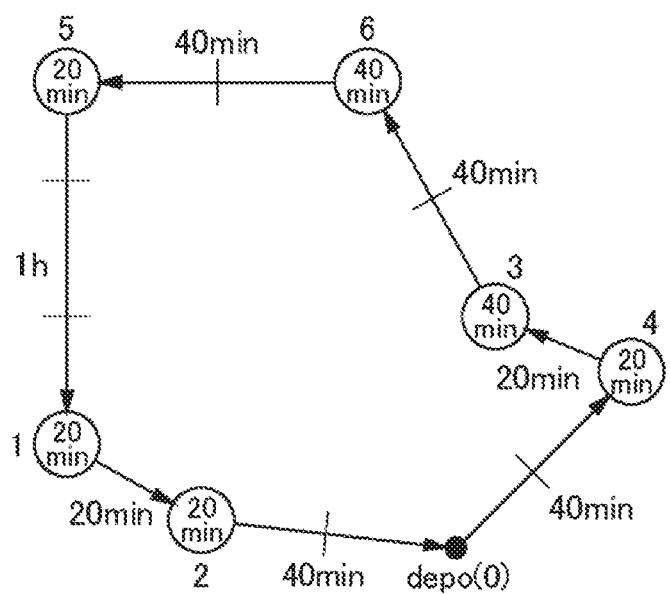
FIG. 4 is a diagram describing a third point according to the embodiment of the present disclosure.
Figure 4:
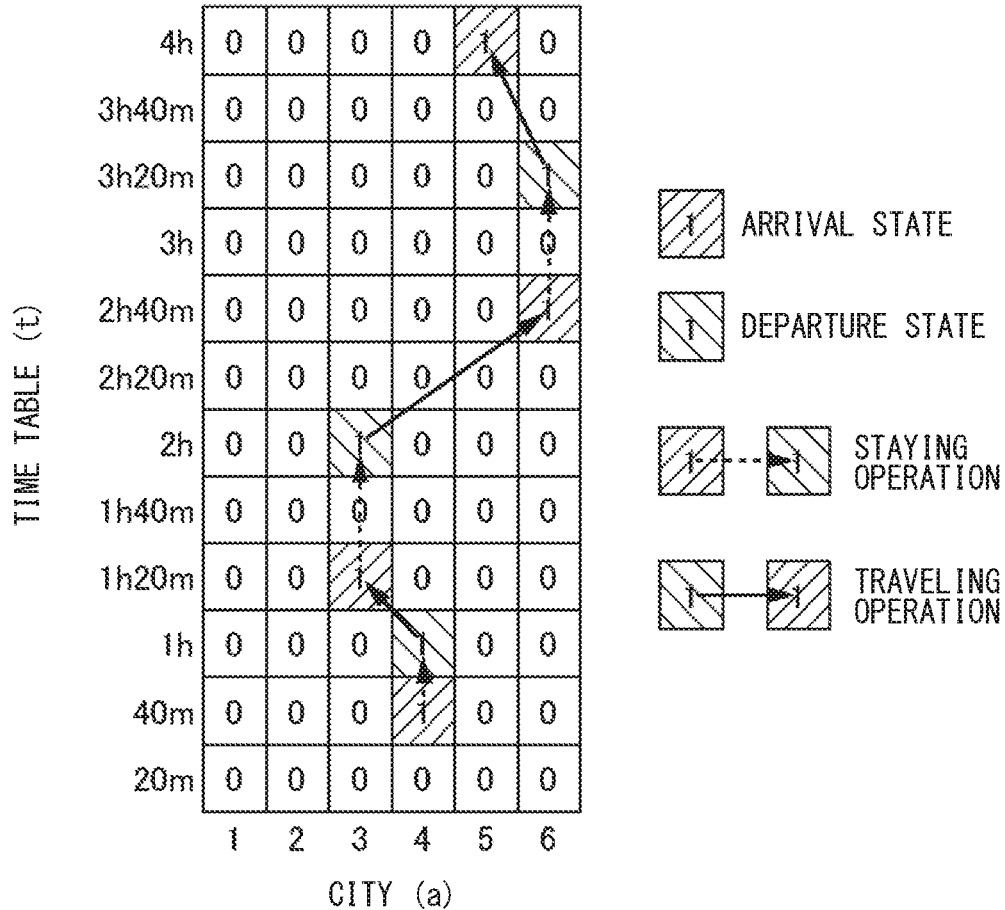

A third point is the introduction of the traveling limit depending on the state due to the application of the dynamic penalty term based on the inter-city relation. FIG. 4 is a diagram describing the third point according to the embodiment of the present disclosure. In the present embodiment, a stay time is described by adding a state. In an example of FIG. 4, as shown in a part (a) of FIG. 4, the stay time in each city is input in units of 20 minutes. As shown in a part (b) of FIG. 4, the QUBO variable defines two states of an arrival state and a departure state, and thereby can describe a stay operation for transiting from the arrival state to the departure state and a traveling operation for transiting from the departure state to the arrival state.

That is, by applying the similar idea to the first point and introducing the interaction in accordance with the inter-city situation, an independent transition cost between different states is expressed. Thereby, it may be possible to set a traveling rule in accordance with the transition between the states. In this way, the new interaction method is introduced to the newly introduced state variable, and the new CTSP or the new CVRP can be formulated. Thereby, it may be possible to describe CTSP or CVRP in consideration of a combination of complex time schedules, the combination being not conventionally possible.

Figure 5:
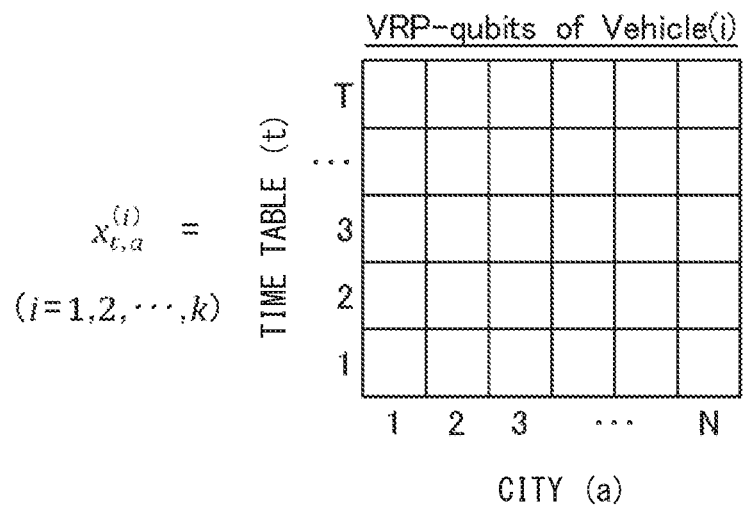
FIG. 5 is a diagram showing a first example of introduction of a QUBO variable according to the embodiment of the present disclosure.

Hereinafter, matters necessary for formulating the present embodiment including the first to third points described above will be described. FIG. 5 is a diagram showing a first example of the introduction of the QUBO variable according to the embodiment of the present disclosure. In this QUBO variable, a quantitative variable t that monotonically increases during the travel is introduced. The quantitative variable t is limited within an increase range of $1 \leq t \leq T$. This quantitative variable t is regarded as, for example, a time schedule per unit time (for example, 20 minutes). Thereby, in particular, the time required for the travel is formulated, and a rest time or the like is added in accordance with the time point. As another example, the quantitative variable t can be set to, for example, a delivery load amount or a pickup load amount (that is, CVRP). When the delivery and the pickup are simultaneously performed, it is contrary to the monotonous increase. Therefore, formulation described later should be performed.

Next, N cities as places to be visited are considered. These may be customers such as delivery destinations in some cases. In addition, k vehicles for the delivery are introduced. Generally, an upper limit T of the quantitative variable and the number of cities of N may depend on each vehicle (i) as shown in the following expression 5.

[Expression 5]

$$(T^{(i)}, N^{(i)}) \text{ for } i=1,2,\ldots,k \tag{5}$$

Figure 6:
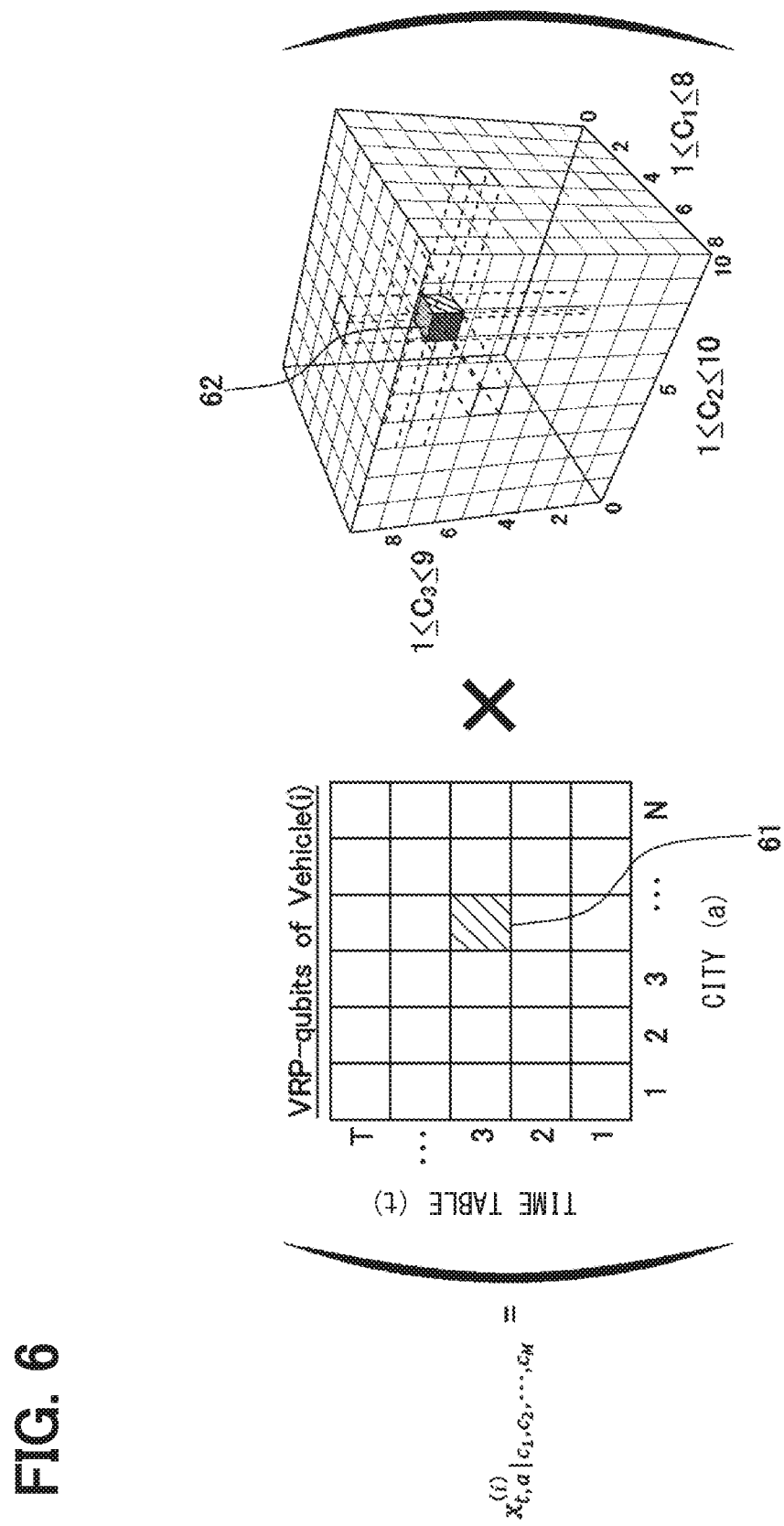
FIG. 6 is a diagram showing a second example of the introduction of the QUBO variable according to the embodiment of the present disclosure.

FIG. 6 is a diagram showing a second example of the introduction of the QUBO variable according to the embodiment of the present disclosure. In FIG. 6, $c_1$ to $c_M$ are multiple capacitated variables. In this QUBO variable, a VRP-QUBO variable 61 of each vehicle (i) is provided with a capacity-QUBO variable. The total number of qubits is given by the following expression 6.

[Expression 6]

$$\prod_{i=1}^{k} \left( T^{(i)} \times N^{(i)} \times \prod_{m=1}^{M} (Q_m^{(i)} - q_m^{(i)} + 1) \right) \tag{6}$$

Each of the capacitated variables ($c_1$ to $c_M$) is limited as shown in the following expression 7 based on the maximum and minimum capacities (integer digits Qm and qm) determined for each vehicle.

[Expression 7]

$$q_m^{(i)} \leq c_m^{(i)} \leq Q_m^{(i)} \ (m=1,2,\ldots,M) \tag{7}$$

This variable can increase or decrease during the travel within the capacity limit described above. Thereby, it may be possible to simultaneously search the delivery and the pickup described above.

Next, the cost of travel from the time point (t) is given in a matrix. For example, the costs of travel from the city (b) at each time point (t) to the city (a) are expressed in the matrix as shown in the following expression 8.

[Expression 8]

$$(d_{ab}^{(t)}) 1 \leq a \neq b \leq N \tag{8}$$

Figure 7:
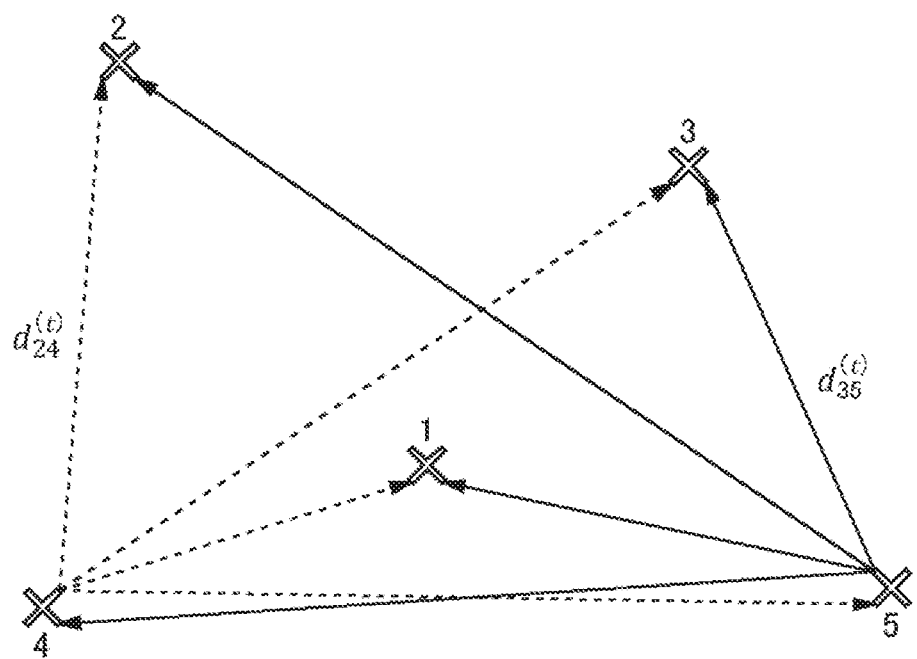
FIG. 7 is a diagram showing an example in which a cost is represented by a matrix according to the embodiment of the present disclosure.

FIG. 7 is a diagram showing an example in which the costs are represented by the matrix according to the embodiment of the present disclosure. When the costs are represented in the matrix, the following is provided. As shown in the following expression 9, generally, a cost matrix is not a symmetric matrix. That is, the cost of travel from the city (a) to the city (b) is different from that from the city (b) to the city (a).

[Expression 9]

$$d_{ab}^{(t)} \neq d_{ba}^{(t)} \text{(in general)} \tag{9}$$

Next, as shown in the following expression 10, generally, a value differs depending on the time point. For example, the degree of traffic congestion changes depending on the time point.

[Expression 10]

$$d_{ab}^{(t)} \neq d_{ab}^{(t')} \text{(in general)} \tag{10}$$

The inter-city cost is the TSP cost or the VRP cost of the inter-city travel, and the specific content is not limited. For example, the inter-city cost may be a cost of a combination of a required fee and a required time, a traveling time, or a travelling distance. The expression 8 and the expressions 9 and 10 hold for not only the time point but also the general capacity (t) monotonically increasing. The similar applies to the following.

Next, the number of required cells accompanying the travel from each time point (t) is provided in the matrix. That is, as shown in the following expression 11, the number of required cells consumed by the travel from the city (b) at each time point (t) to the city (a) is provided in a positive integer matrix.

[Expression 11]

$$(n_{ab}^{(t)}) 1 \leq a, b \leq N \ (n_{ab}^{(t)} \geq 1) \tag{11}$$

When the number of required cells that are consumed is represented by the positive integer matrix, the following holds. As shown in the following expression 12, generally, a matrix of the consumption cell number is the asymmetric matrix.

[Expression 12]

$$n_{ab}^{(t)} \neq n_{ba}^{(t)} \text{(in general)} \tag{12}$$

For example, when the required time is the consumption cell, the consumption cell of the travel from the city (a) to the city (b) is different from that from the city (b) to the city (a). When the capacity is interpreted to be determined only by the destination, the matrix is generally asymmetric.

Generally, it may depend the type (i) of the vehicle. Furthermore, when the number of required cells is always 1, the result is the normal TSP or the normal VRP, as shown in the following expression 13. That is, the standard TSP or the standard VRP can be generalized.

[Expression 13]

$$n_{ab}^{(t)} = 1 \tag{13}$$

Next, a capacity increase-decrease matrix accompanying the travel from each time point (t) is provided. Increase or decrease (for example, the delivery and the pickup) of m capacities during the travel from the city (b) at each time point (t) to the city (a) is given by m matrices as shown in the following expression 14.

[Expression 14]

$$(B_{ab|m}^{(t)}) 1 \leq a, b \leq N \ (m=1,2,\ldots,M) \tag{14}$$

This is an integer that can be positive, negative, or zero for providing the capacity increasing or decreasing until the next travel. As shown in the following expression 15, generally, the consumption matrix is asymmetric.

[Expression 15]

$$B_{ab|m}^{(t)} \neq B_{ba|m}^{(t)} \ (m=1,2,\ldots,M)\text{(in general)} \tag{15}$$

Further, the increase or decrease of the capacity may be changed for each vehicle.

This capacity can be regarded as a state. In this case, a matrix including the states of the cities (a) and (b) between (a|c) and (b|c') is prepared, and the similar interaction is introduced, as shown in the expression 16.

[Expression 16]

$$\left(B^{(t)}_{(a|c')(b|c)|m}\right)_{\substack{1\le a,b\le N \\ q\le c', c\le Q}}$$

Thereby, the selection of the next state of the vehicle based on the inter-city relation is provided to the state of each vehicle.

Next, the formulation method (QUBO-Hamiltonian) will be described. A first example of setting a standard constraint term will be described. In this example, the constraint term is introduced as a penalty term. The coefficient is set to λ. In the ising machine, the coefficient λ is not set to be infinite, and therefore usually set to the maximum value that can be set. For example, in a D-Wave machine (manufactured by D-wave systems Inc.), when J is equal to 1 (J=1), J is maximum, and the corresponding value may be set.

Since each vehicle (i) does not simultaneously visit the two cities at each time point (t), the constraint of the following expression 17 is set.

$$\lambda \times x_{t,a}^{(i)} x_{t,b}^{(i)} \quad (\forall a \ne \forall b; \forall i, \forall t) \quad \text{[Expression 17]}$$

When the vehicle (i) visits the city (a) at the time point (t), the vehicle does not visit the city (a) at a different time (t'). Therefore, the constraint of the following expression 18 is set.

$$\lambda \times x_{t,a}^{(i)} x_{t',a}^{(i)} \quad (\forall a, \forall i, \forall t \ne \forall t') \quad \text{[Expression 18]}$$

When the vehicle (i) visits the city (a) at the time point (t), a different vehicle (j) does not visit the city (a) at any time. Therefore, the constraint of the following expression 19 is set.

$$\lambda \times x_{t,a}^{(i)} x_{t',a}^{(j)} \quad (\forall a, \forall i \ne \forall j, \forall t \forall t') \quad \text{[Expression 19]}$$

Next, as a second example of setting the standard constraint term, a case where there is the capacity will be described. In the case where there is the capacity (similarly to a case where the capacity-qubit is present), the following constraint is imposed.

For each vehicle (i), one capacity-QUBO variable is provided for each time point (t) and each city (a). Therefore, the following expression 20 is set.

$$\lambda \times x_{t,a|c}^{(i)} x_{t,a|c'}^{(i)} \quad (\forall a, \forall i, \forall t, \forall c \ne \forall c') \quad \text{[Expression 20]}$$

Each vehicle (i) does not simultaneously visit the two cities at each time point (t). Therefore, the following expression 21 is set.

$$\lambda \times x_{t,a|c}^{(i)} x_{t,b|c'}^{(i)} \quad (\forall a \ne \forall b, \forall i, \forall t, \forall c, \forall c') \quad \text{[Expression 21]}$$

When the vehicle (i) visits the city (a) at the time (t), the vehicle does not visit the city (a) at the different time point (t'). Therefore, the constraint of the following expression 22 is set.

$$\lambda \times x_{t,a|c}^{(i)} x_{t',a|c'}^{(i)} \quad (\forall a, \forall i, \forall t \ne \forall t', \forall c, \forall c') \quad \text{[Expression 22]}$$

When the vehicle (i) visits the city (a) at the time point (t), the different vehicle (j) does not visit the city (a) at any time. Therefore, the constraint of the following expression 23 is set.

$$\lambda \times x_{t,a|c}^{(i)} x_{t',a|c'}^{(j)} \quad (\forall a, \forall i \ne \forall j, \forall t, \forall t', \forall c, \forall c') \quad \text{[Expression 23]}$$

Figures 8, 9:
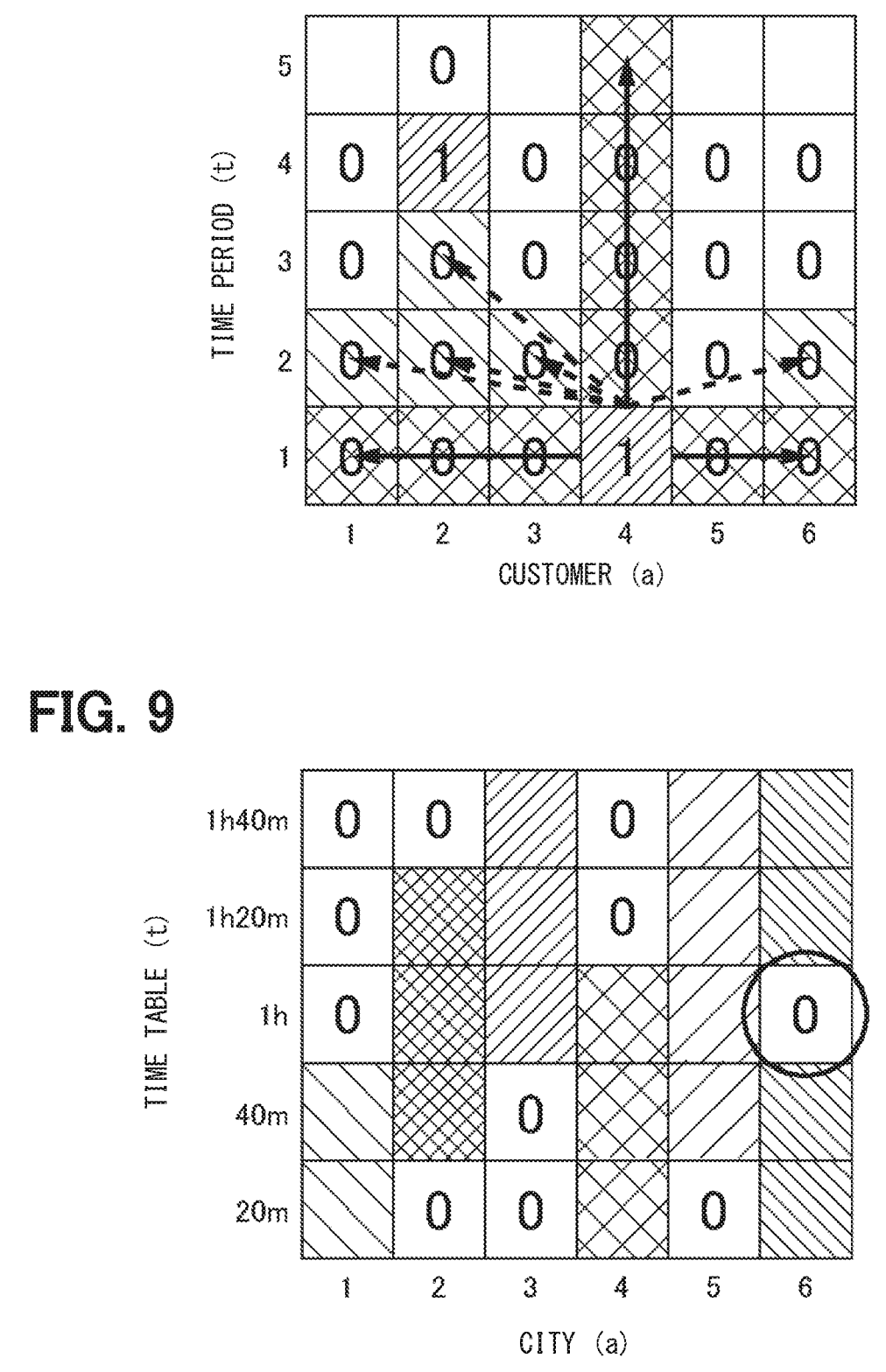

FIG. 8 is a diagram describing a consumption cell number constraint according to the embodiment of the present disclosure. A first example of setting the consumption cell number constraint term and the cost term will be described. For configurations less than the consumption cell number required for the travel, the constraint term of the following expression 24 is forbidden by the penalty term. The coefficient is set to λ.

[Expression 24]

$$\sum_{\delta t=1}^{n_{ab}^{(t)}-1} \lambda \times x_{t+\delta t, a}^{(i)} x_{t,b}^{(i)} \quad (\forall a \ne \forall b, \forall t, \forall i, \text{ if } n_{ab}^{(t)} > 1)$$

In some ising machine, the coefficient λ cannot be set to be infinite, and therefore usually set to the maximum value that can be set. For example, in the D-Wave machine, when J is equal to 1 (J=1), J is maximum, and the corresponding value may be set.

Additionally, the cost is introduced into the qubits corresponding to the consumption cell number, as show in the following expression 25.

[Expression 25]

$$\frac{d_{ab}^{(t)} - \mu}{\rho} \times x_{t+n_{ab}^{(t)}, a}^{(i)} x_{t,b}^{(i)} \quad (\forall a \ne \forall b, \forall t, \forall i, \text{ if } n_{ab}^{(t)} > 1)$$

Here, as the parameters that can be generally introduced, u (>0) and p (>0) are introduced.

Next, as a second example of setting the consumption cell number constraint term and the cost term, a case of including the capacity will be described. In a case of being less than the consumption cell number due to the travel, as shown in the following expression 26, the constraint is forbidden by the penalty term.

[Expression 26]

$$\sum_{c,c'} \sum_{\delta t=1}^{n_{ab}^{(t)}-1} \lambda \times x_{t+\delta t, a|c'}^{(i)} x_{t,b|c}^{(i)} \quad (\forall a \ne \forall b, \forall t, \forall i; \text{ if } n_{ab}^{(t)} > 1)$$

Additionally, the cost and the capacity constraint are introduced as follows. As the cost term (configuration that satisfies the capacity constraint), the following expression 27 is set.

[Expression 27]

$$\frac{d_{ab}^{(t)} - \mu}{\rho} \times x_{t+n_{ab}^{(t)}, a|c+B_{ab}^{(t)}}^{(i)} x_{t,b|c}^{(i)} \quad (\forall a \ne \forall b, \forall t, \forall i, \forall c)$$

As the penalty term (configuration that does not satisfy the capacity constraint), the following expression 28 is set,

[Expression 28]

$$\sum_{\forall c'(\ne c + B_{ab}^{(t)})} \lambda \times x_{t+n_{ab}^{(t)}, a|c'}^{(i)} x_{t,b|c}^{(i)} \quad (\forall a \ne \forall b, \forall t, \forall i, \forall c)$$

Next, a total QUBO-Hamiltonian will be described. The total Hamiltonian is provided by the following expression 29.

[Expression 29]

$$\mathcal{H} = \sum_{\forall a \neq \forall b, \forall t, \forall i} \left( \frac{d_{ab}^{(t)} - \mu}{\rho} \times x_{t+n_{ab}^{(t)},a}^{(i)} x_{t,b}^{(i)} + \sum_{1 \leq \delta t \leq n_{ab}^{(t)}-1} \lambda \times x_{t+\delta t,a}^{(i)} x_{t,b}^{(i)} \right) ++ \lambda \times$$

$$\left( \sum_{\forall a \neq \forall b, \forall t, \forall i} x_{t,a}^{(i)} x_{t,b}^{(i)} + \sum_{\forall a, \forall t \neq \forall t', \forall i \neq \forall j} x_{t,a}^{(i)} x_{t',a}^{(j)} + \sum_{\forall a, \forall t, \forall i \neq \forall j} x_{t,a}^{(i)} x_{t,a}^{(j)} \right)$$

Here, in the expression 29, an internal part of the sigma of the first term in the right side is the dynamic penalty term newly introduced in the present disclosure.

It is desirable that parameters $\mu$, $\rho$, and $\lambda$ satisfy a relation of the following expression 30,

[Expression 30]

$$\mu = d_{max}, \rho = \frac{d_{max} - d_{min}}{\lambda}$$

This is called coastline conditions. Since the A, corresponds to overall scaling, the $\lambda$ may be adjusted to the maximum value suited for a mechanical limit so as to include the coefficient.

The total QUBO-Hamiltonian including the capacity is as follows. In this case, the total QUBO-Hamiltonian is provided by the following expression 31,

[Expression 31]

$$\mathcal{H} =$$

$$\sum_{\forall a \neq \forall b, \forall t, \forall i, \forall c} \left( \frac{d_{ab}^{(t)} - \mu}{\rho} \times x_{t+n_{ab}^{(t)},a|c+B_{ab}^{(t)}}^{(i)} x_{t,b|c}^{(i)} ++ \sum_{\forall c'(\neq c+B_{ab}^{(t)})} \lambda \times x_{t+n_{ab}^{(t)},a|c'}^{(i)} x_{t,b|c}^{(i)} + \right.$$

$$\left. \sum_{\forall c'} \sum_{1 \leq t \leq n_{ab}^{(t)}-1} \lambda \times x_{t+\delta t,a|c'}^{(i)} x_{t,b|c}^{(i)} \right) ++ \lambda \times$$

$$\left( \sum_{\forall a, \forall t, \forall i, \forall c' \neq \forall c} x_{t,a|c'}^{(i)} x_{t,a|c}^{(i)} + \sum_{\forall a \neq \forall b, \forall t, \forall i, \forall c', \forall c} x_{t,a|c'}^{(i)} x_{t,b|c}^{(i)} ++ \right.$$

$$\left. \sum_{\forall a, \forall t' \neq \forall t, \forall i \neq \forall j, \forall c', \forall c} x_{t',a|c'}^{(i)} x_{t,a|c}^{(j)} + \sum_{\forall a, \forall t, \forall i \neq \forall j, \forall c', \forall c} x_{t,a|c'}^{(i)} x_{t,a|c}^{(j)} \right)$$

It is desirable that the coastline conditions of the parameters $\mu$, $\rho$, and $\lambda$ satisfy the relation of the expression 30. Since the $\lambda$ corresponds to overall scaling, the $\lambda$ may be adjusted to the maximum value suited for the mechanical limit so as to include the coefficient.

Regarding the third point described above, the coastline condition that is a new leading principle regarding setting of the coefficient of the constraint term by the penalty will be described. The latest conventional formulation does not satisfy the following coastline conditions. On the other hand, it has been confirmed that, in the TSP using the coastline conditions, the probability of appearance of the solution significantly increases as compared with the confirmed method. The Hamilton of the QUBO formulation proposed in the present embodiment is generally expressed as the following expression 32 and the following expression 33.

[Expression 32]

$$\mathcal{H} = \sum_{\langle A,B \rangle \in Pb} \epsilon_{AB} \times x_A x_B + \sum_{\langle A,B \rangle \in Pn} \lambda \times x_A x_B$$

[Expression 33]

$$\left( \begin{array}{l} Pb: \text{problem configurations} \\ Pn: \text{configulations with penalty} \end{array} \right)$$

The $\langle A, B \rangle \in Pb$ of the first term in the right side of the expression 32 is the configuration that satisfies the constraint, and the $\langle A, B \rangle \in Pn$ of the second term in the right side is the configuration that does not satisfy the constraint. At a stage of the One-body Hamiltonian, the following conditions are imposed. At this time, the configurations that satisfy the constraint in the Pb needs to actively rise, and therefore should have negative energy.

$$\therefore \epsilon_{AB} < 0 \quad \text{[Expression 34]}$$

The appearance of the configuration that does not satisfy the constraint needs to be suppressed, and therefore has the positive energy.

$$\therefore \epsilon_{AB} + \lambda > 0 \quad \text{[Expression 35]}$$

From the above, in order to satisfy the two conditions of the expression 34 and the expression 35 for all costs, the range of energy ($\epsilon$ ab) may be selected as shown in the following expression 36.

$$-\lambda \leq \epsilon_{AB} \leq 0 \quad \text{[Expression 36]}$$

This leading principle in which the Pb and the Pn are separated at the coastline (zero energy) is called the coastline conditions.

Next, as a fourth point of the present disclosure, a setting method of each of various constraint terms with the QUBO formulation of the CTSP or the CVRP according to the present embodiment will be described. When the consumption cell is regarded as the time point, the introduction method of the consumption change depending on the departure time is as follows. The cost for the configurations satisfying the constraint is provided by a cost matrix of a term of the following expression 37 and the following expression 38.

[Expression 37]

$$(d_{ab}^{(t)})_{1 \leq a \neq b \leq N}$$

[Expression 38]

$$\frac{d_{ab}^{(t)} - \mu}{\rho} \times x_{t+n_{ab}^{(t)},a|c+B_{ab}^{(t)}}^{(i)} x_{t,b|c}^{(i)} \quad (\forall a \neq \forall b, \forall t, \forall i, \forall c)$$

In the formulation of the conventional technology shown in the following expression 39, the cost is introduced in the closest step.

$$d_{ab} x_{s+1,a} x_{s,b} \quad (\forall a \neq \forall b, \forall s) \quad \text{[Expression 39]}$$

When the expression 39 depends on the step number (s), the following expression 40 can be provided.

$$(d_{ab} \to d_{ab}^{(s)}) \quad \text{[Expression 40]}$$

However, the concept of time point does not exist in the conventional technology, only deterioration or the like due to the number of stays can be expressed. That is, the conventional technology may be not possible to express the time change of the cost. Accordingly, in the present embodiment, the concept of timetable occurs, and thereby it may be possible to newly describe a wide description such as the time change of the cost.

The concept of cost can be set arbitrarily, and selected in accordance with problems such as distance, time, cost, or priority.

The method of introducing the change in the number of consumed cells depending on the departure time is as follows. The consumption cell number due to the travel is given by the consumption cell number matrix.

$$(n_{ab}^{(i)}) 1 \leq a \neq b \leq N \quad \text{[Expression 41]}$$

Here, the consumption cell number matrix can be set independently of the cost matrix. For example, when the required time is expressed, the required time is changed depending on the departure time. As an application of this introduction method, when the time is required to spread across a certain time point, the rest time can be described by adding the corresponding consumption cell number. The stay time can be described by adding the consumption cell in addition to the required time due to the actual travel. However, when the stay time is strictly set within a designated time, the state should be used.

Next, a method of introducing a change in increase or decrease of the capacity depending on the departure time will be described. The increase or decrease in capacity due to the travel is provided by a capacity increase-decrease matrix.

$$(B_{ab|m}^{(i)}) 1 \leq a,b \leq N \ (m=1,2,\ldots,M) \quad \text{[Expression 42]}$$

Here, the capacity increase-decrease matrix can be set independently of the consumption cell number matrix or the cost matrix. This increase-decrease matrix can also be changed depending on the departure time, FIG. 9 is a diagram describing allowance or rejection of an arrival according to the present embodiment of the present disclosure. Hereinafter, the arrival allowance and the arrival rejection in accordance with an arrival time point at each city and the arrival allowance and the arrival rejection for each vehicle type will be described. By using the formulation of the TSP or the VRP with the time point according to the present embodiment, it may be possible to formulate the arrival allowance and the arrival rejection at the city in a certain time zone.

As shown by a circle of FIG. 9, qubits in time zones other than time zones corresponding to the arrival allowance are forcibly set to 0. This setting can be individually applied to each vehicle (i). The vehicle type selection in the city may be implemented. An advantage of this formulation includes: an advantage (1) of providing the arrival allowance for the multiple time zones and an advantage (2) of being possible to reduce the number of used qubits.

Next, an interaction generating a distribution loading tendency regarding the capacity will be described. A method for easily generating the distribution loading tendency will be described although the loading capacity limit is not set as strictly as the capacity-qubits. This method is useful since the method is sufficient in practice.

The new qubits regarding a capacity (m) requiring to generate a capacity tendency is introduced for each vehicle (i).

$$\{y_m^{(i)}\}_{1 \leq m \leq M}^{1 \leq i \leq k} \quad \text{[Expression 43]}$$

In addition to this, an interaction of the following expression 44 is added.

[Expression 44]

$$\lambda \times \sum_{m=1}^{M} \sum_{\forall i} y_m^{(i)} \left[ \sum_{\forall a, \forall t} \left( \frac{v_{m,a}}{V_m^{(i)}} \right) x_{t,a}^{(i)} - 1 \right]$$

Here, the capacity represents a capacity that has a type of (m) and is associated with each city (a).

$$\{v_{m,a}\}_{1 \leq m \leq M}^{1 \leq a \leq N} \quad \text{[Expression 45]}$$

The capacity is positive, and the following expression 46 holds.

$$v_{m,a} > 0 \quad \text{[Expression 46]}.$$

A capacity limit of the capacity having the type of (m) for each vehicle (i) is expressed by the following expression 47.

$$V_m^{(i)} \quad \text{[Expression 47]}$$

The efficacy of this interaction is as follows. The added qubits rise within the capacity limit, and the overall energy decreases. When the capacity limit is reached, the positive energy is required for the rising cost of the qubits. The added qubits fall. Accordingly, at the capacity limit, the relative cost occurs, and the distribution loading tendency can be generated.

As described above, in the present embodiment, the formulation method of introducing the concept of time point, capacity, or the like in the TSP and the VRP into the ising QUBO format by introducing the new penalty term based on the relation between cities has been proposed. Hereinafter, the formulation according to the present embodiment will be described.

Embodiment 1

Figure 10:
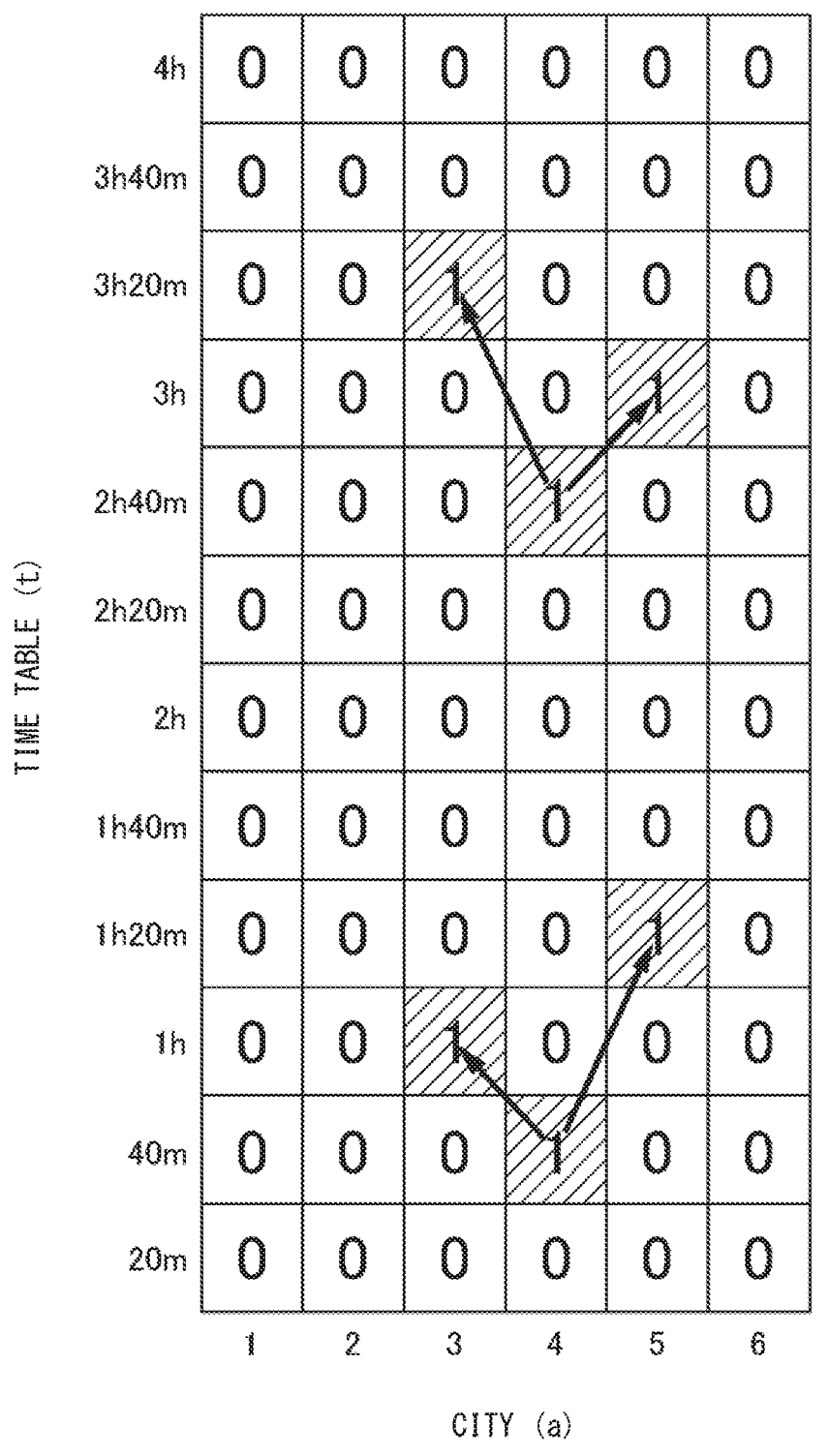
Figure 11A:
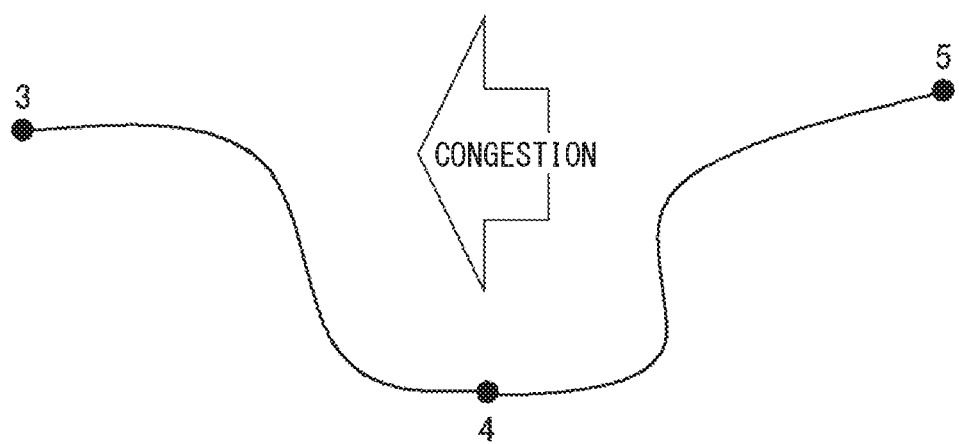
FIG. 11A is a diagram describing the embodiment 1 according to the present embodiment of the present disclosure.
Figure 11B:
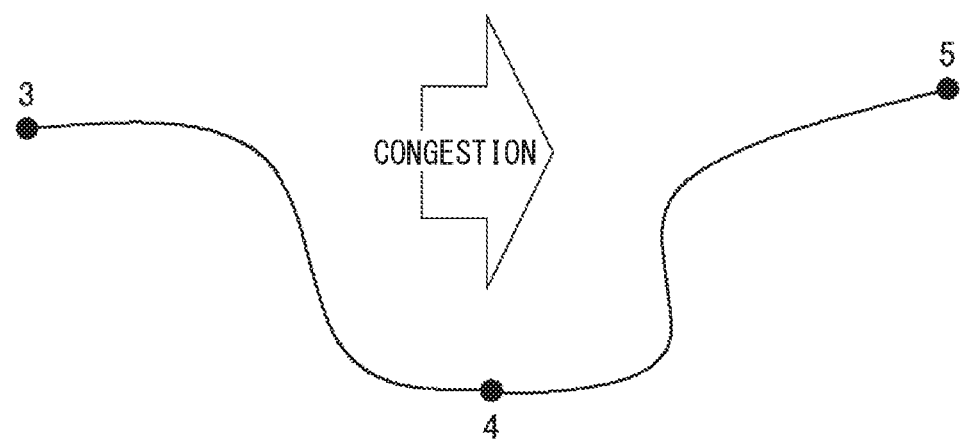
FIG. 11B is a diagram describing the embodiment 1 according to the present embodiment of the present disclosure.

FIG. 10 and FIGS. 11A and 11B are diagrams describing an embodiment 1. The embodiment 1 is an example of a problem that the road situation changes depending on the time zone, that is, the time change of the traveling cost. The present embodiment is an example in which the cost of the ising solver depends on the time or the capacitated variable monotonically increasing or decreasing. The common time of each vehicle of VRP is defined, and therefore it may be possible to formulate a problem including the time change in cost. Thereby, it may be possible to formulate a situation where the arrival time changes depending on the congestion situation.

As shown in FIG. 10, the traveling time increases or decreases due to the congestion after two hours. For example, as shown in FIG. 11A, the congestion occurs on a down line of a highway, and it takes time to visit a city 3. As shown in FIG. 11B, the congestion occurs on an upper line of the highway, it takes time to visit a city 5. In this way, optimization can be considered in consideration of which time zone and where to deliver, in addition to the consideration of traffic situation.

Embodiment 2

Figure 12:
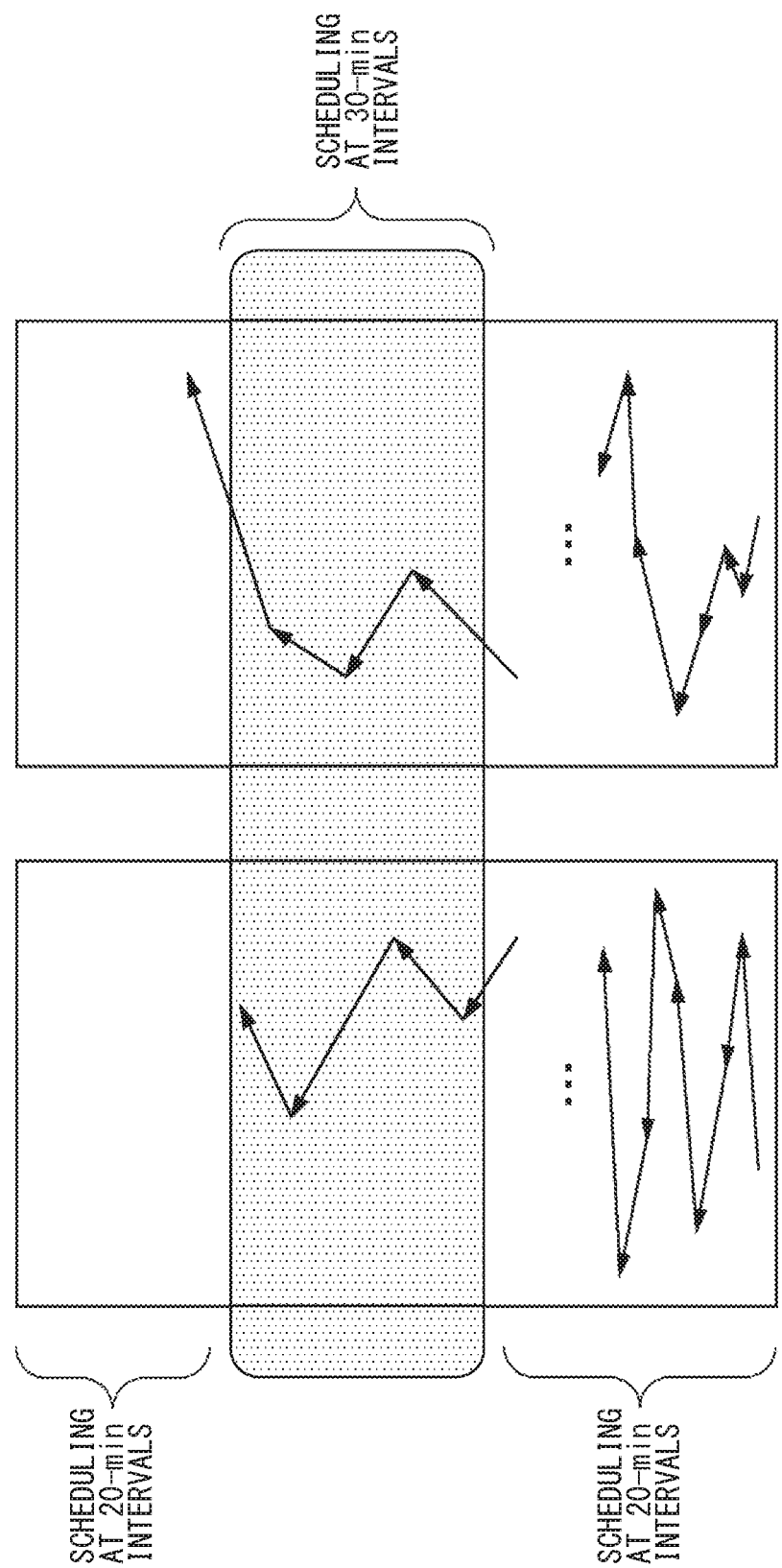
FIG. 12 is a diagram describing an embodiment 2 according to the present embodiment of the present disclosure.

FIG. 12 is a diagram describing an embodiment 2. The embodiment 2 is an example of the time point change of a schedule in units of time. The present embodiment is an example in which the schedule time unit in the timetable of the ising solver has time point dependency. When it is known that a total of specific required times increases in accordance with the change such as a congestion situation of a traffic network (that is, when the shortest traveling time increases), it may be possible to change a time interval in the time zone. As show in FIG. 12, it may be possible to change a schedule interval corresponding to the time zone in which the shortest traveling time increase. Thereby, it may be possible to save the number of qubits.

Embodiment 3

Figure 13:
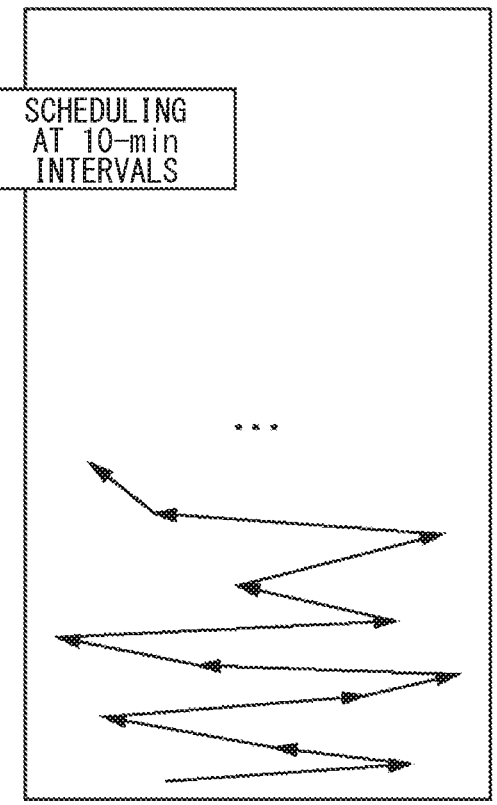
FIG. 13 is a diagram describing an embodiment 3 according to the present embodiment of the present disclosure.
Figure 13:
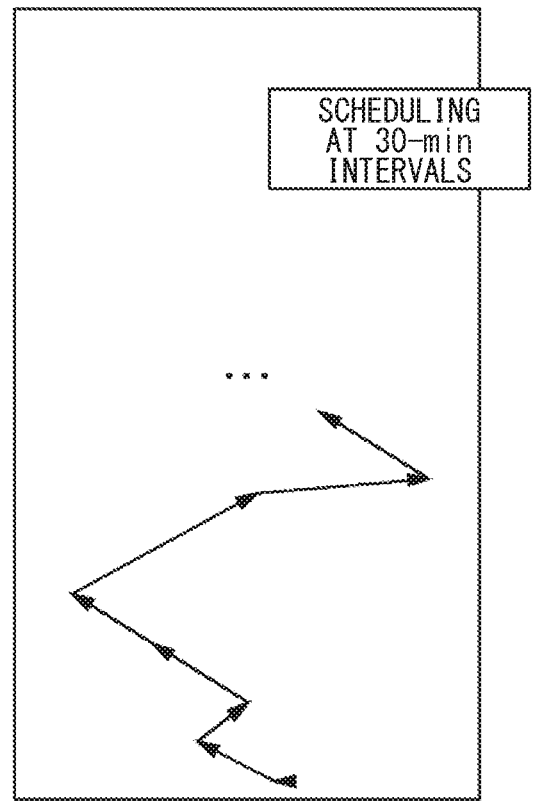

FIG. 13 is a diagram describing an embodiment 3. The embodiment 3 is an example of a vehicle type dependency of the schedule interval. The present embodiment is an example in which the schedule time unit in the timetable of the ising solver has the vehicle type dependency. When the VRP is solved in a state of additionally including a vehicle type traveling at a different speed, the schedule interval can be changed for each vehicle type. As show in FIG. 13, a vehicle type 1 is, for example, a bicycle service, or the like. In this case, the vehicle type 1 can turn in a small space, and does not receive the affection such as traffic conditions. Therefore, the scheduling is performed at intervals of 10 minutes. On the other hand, a vehicle type 2 is, for example, an ordinary vehicle delivery. In this case, it takes time due to the traffic conditions. Therefore, the scheduling is performed at intervals of thirty minutes. In this way, it may be possible to change the schedule interval in accordance with each vehicle type based on the delivery speed of the vehicle type.

Embodiment 4

Figure 14A:
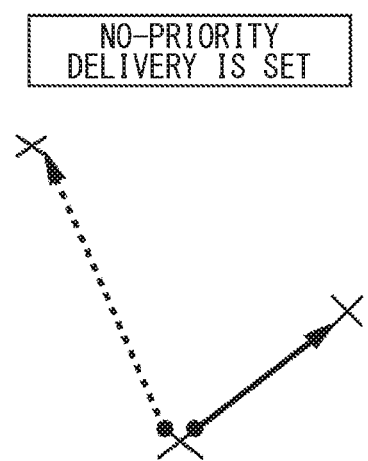
FIG. 14A is a diagram describing an embodiment 4 according to the present embodiment of the present disclosure.
Figure 14B:
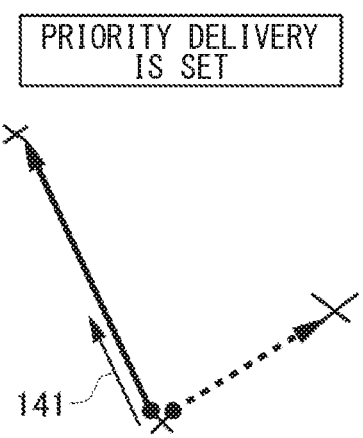
FIG. 14B is a diagram describing an embodiment 4 according to the present embodiment of the present disclosure.

FIGS. 14A and 14B are diagrams describing an embodiment 4. The embodiment 4 is an example of priority delivery. The present embodiment is an example in which the number of steps of the ising solver and the cost are generally different. In order to deal with the priority delivery, as shown in the following expression 48, a cost to arrive at a customer (city a) that desires the priority order may be set to be small.

$$d_{ab}^{(i)} \rightarrow \varphi * d_{ab}^{(i)} \ (0<\varphi<1)$$ [Expression 48]

FIG. 14A shows a case where there is no priority delivery setting, FIG. 14B shows a case where there is the priority delivery setting. As shown in FIG. 14A, when there is no priority delivery setting, the closer one has priority. On the other hand, as shown in FIG. 14B, when there is the priority delivery setting, a customer (city) that is slightly far as compared to the closest one may have the priority of the delivery. An arrow 141 is a distance actually input by the priority delivery setting. By selecting the parameter φ in the expression 48, it may be possible to determine how much priority is provided to the priority delivery for the overall optimization.

Embodiment 5

An embodiment 5 is an example of setting the loading capacity and a weight limit. The present embodiment is an example in which the capacitated variable of the ising solver is added to the capacity change with the destination city. The minimum capacity of weight of a delivered package is set as a unit. For example, regarding the capacity, there is a size from 60 to 120 obtained by adding the height and the width as a size designation. Here, for example, a volume of 120 sizes is set as a unit of 0.08 m³, and a maximum capacity in a 2-ton track is set to 16 m³. Extremely small items such as letter packs (registered trademark) are converted as 0 size. Accordingly, it is determined that Qvol is equal to 180 (Qvol=180).

These settings are performed for each vehicle, as shown in the following expression 49.

$$0 \le c_{vol}^{(i)} \le Q_{vol}^{(i)}, \ 0 \le c_{wgt}^{(i)} \le Q_{vol}^{(i)} \ (i=1,2,\ldots,k)$$ [Expression 49]

Actually, it is not often necessary to take the capacity limit into account so much. For these, the following multi-step solution may be used. That is, the delivery that does not extremely pass the capacity limit is selected out first. For this, the problem of the simple CVRP is first solved, the vehicle that cannot be transported is selected, and the delivery vehicle type is determined. After that, when the vehicle type is specified and the TS-SVRP without the capacity limit is solved, the calculation can be performed while the consumption of qubits is suppressed. In this way, according to the present embodiment, it may be possible to simultaneously perform the delivery and the pickup since the problem within the capacity limit is considered.

Embodiment 6

Figure 15:
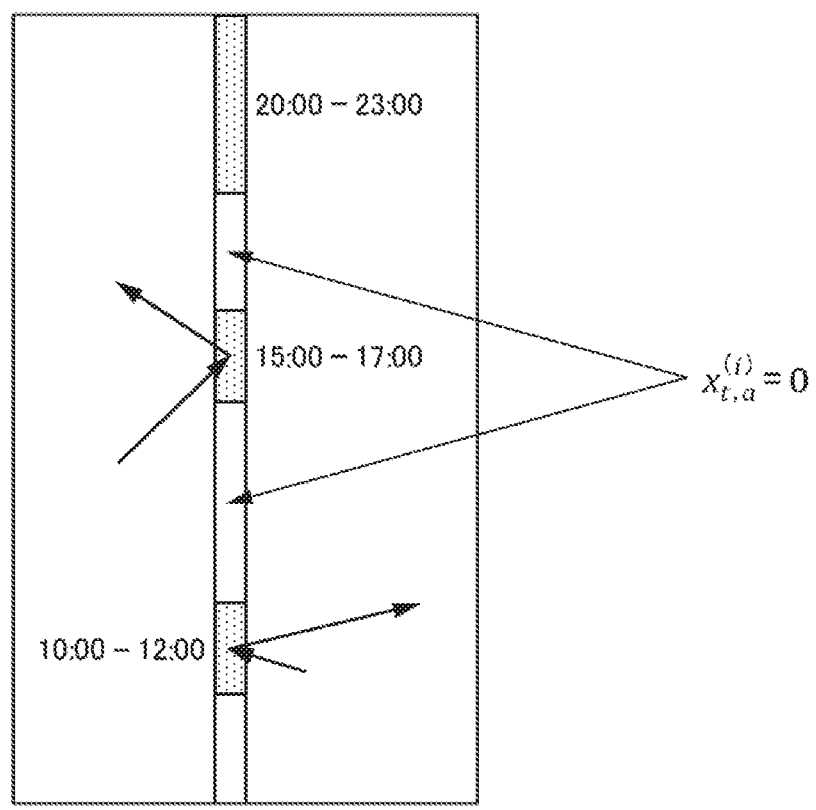
FIG. 15 is a diagram describing an embodiment 6 according to the present embodiment of the present disclosure.

FIG. 15 is a diagram describing an embodiment 6. The embodiment 6 is an example of a time designation of the delivery. The present embodiment is an example of a method for setting the allowance to arrive at the city in accordance with the time point of the ising solver or the capacity monotonically increasing or decreasing. The delivery time to the customer (city) can be set in the time unit of the schedule. As shown in FIG. 15, when a time zone in which the delivery to the customer is possible is designated, the qubits of a time zone in which the delivery is not possible may be set to 0. According to the present embodiment, it may be possible to ease the formulation of the multi-window.

Embodiment 7

Figure 16:
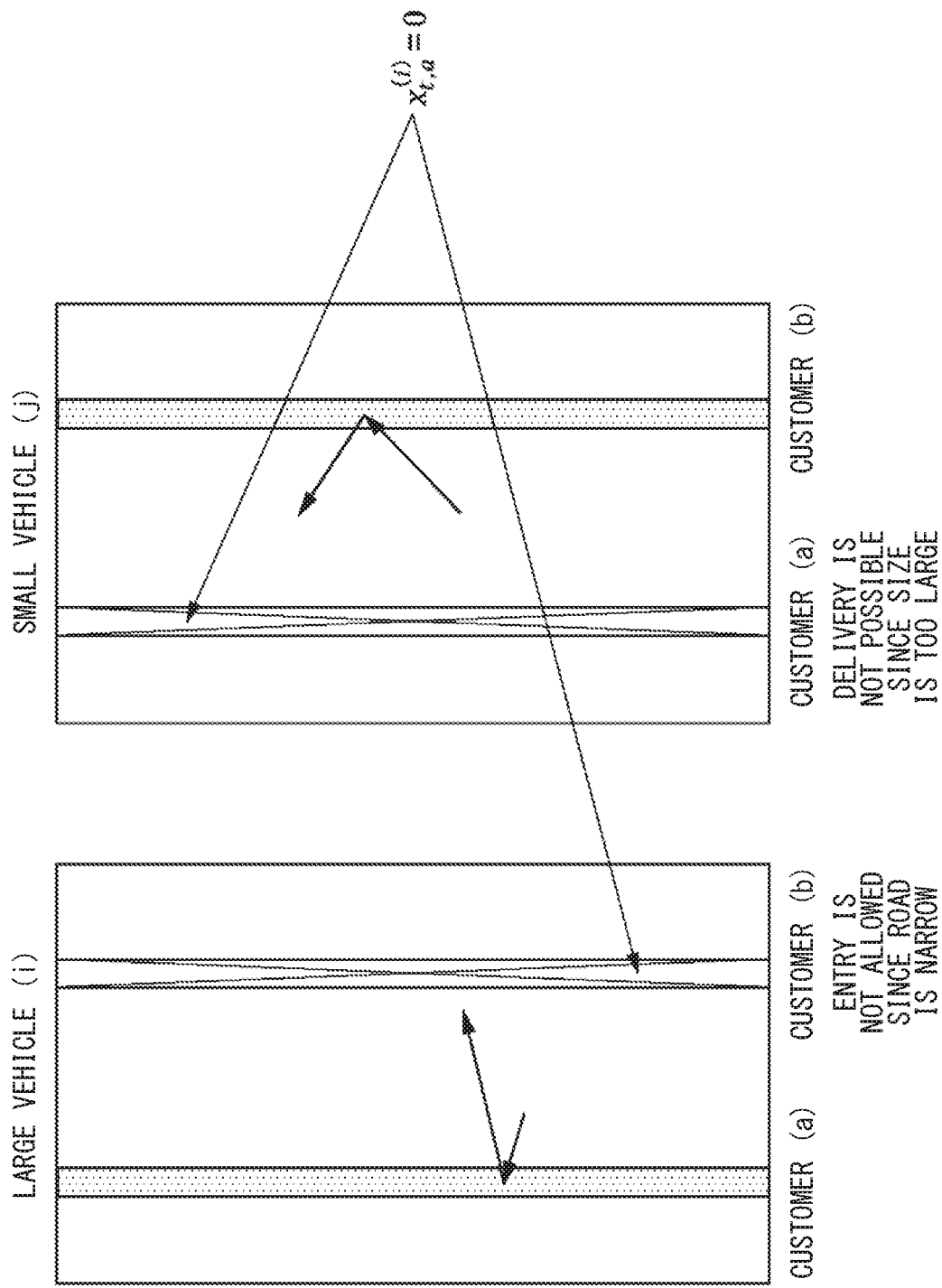
FIG. 16 is a diagram describing an embodiment 7 according to the present embodiment of the present disclosure.
Figure 17:
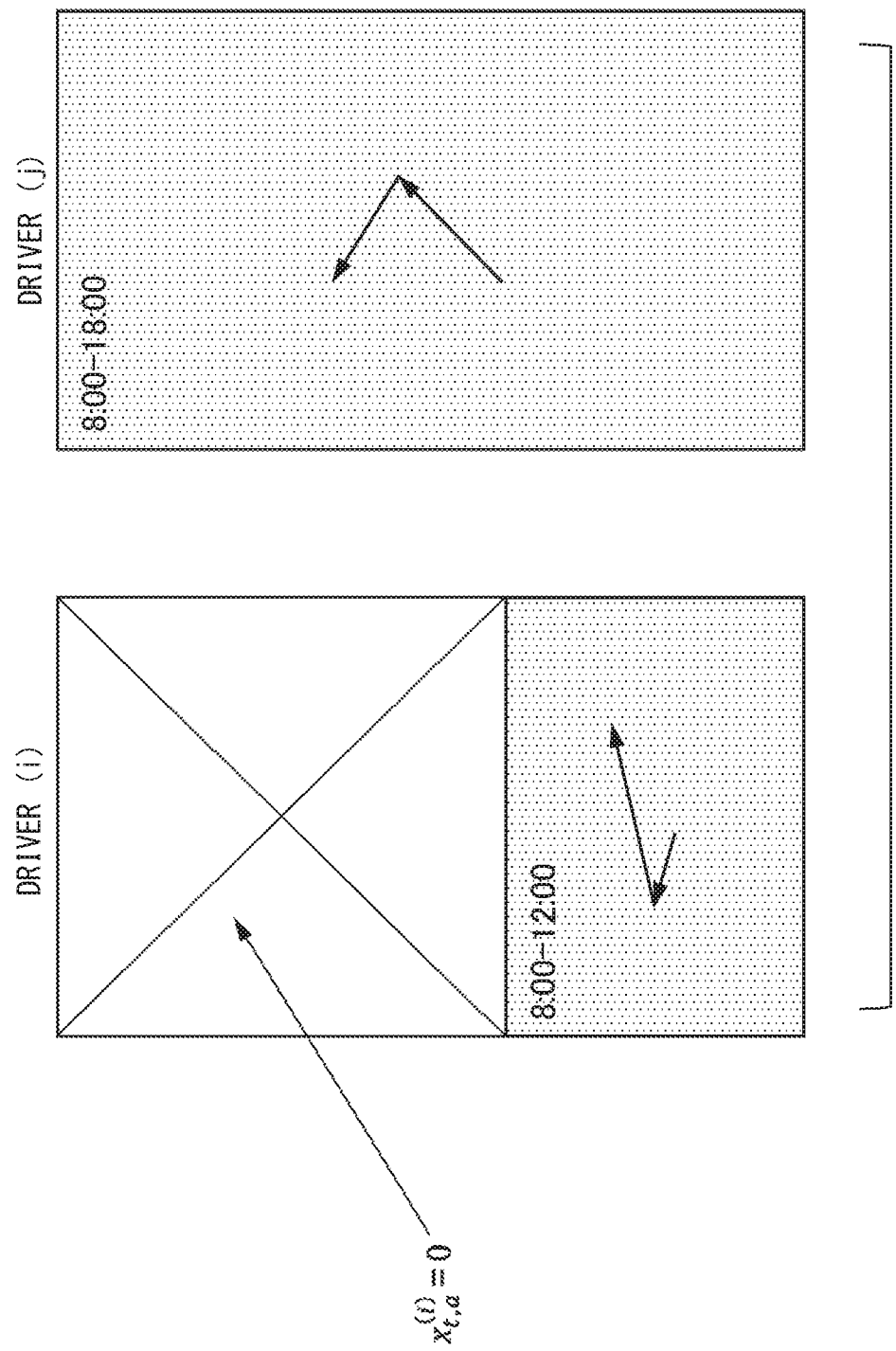
FIG. 17 is a diagram describing an embodiment 8 according to the present embodiment of the present disclosure.

FIG. 16 is a diagram describing an embodiment 7. The embodiment 7 is an example of a vehicle type designation of the delivery. The present embodiment is an example in which the arrival allowance or the arrival rejection in some cities for a specific vehicle is set in the ising solver. According to the present embodiment, it may be possible to limit the delivery vehicle type to the customer (city). As shown in FIG. 17, for a large vehicle (i), a customer (b) is not allowed to enter a narrow road. For a small vehicle (j), a customer (a) cannot deliver goods since the goods is too large. The qubits of vehicle type that cannot deliver the goods described above may be manually set to 0. According to the present embodiment, it may be possible to formulate the type-window.

Embodiment 8

FIG. 17 is a diagram describing an embodiment 8. The embodiment 8 is an example of setting a working time of a delivery driver. The present embodiment is an example in which the time point of the ising solver or the range of the capacity monotonically increasing or decreasing differs for each vehicle. All work should be completed within the working time of each driver. In the similar manner as described above, when a driver (i) works in the morning, the qubits outside the working time may be manually set to 0 as shown in FIG. 17. Thereby, it may be possible to formulate the time-window of the driver.

Embodiment 9

Figure 18:
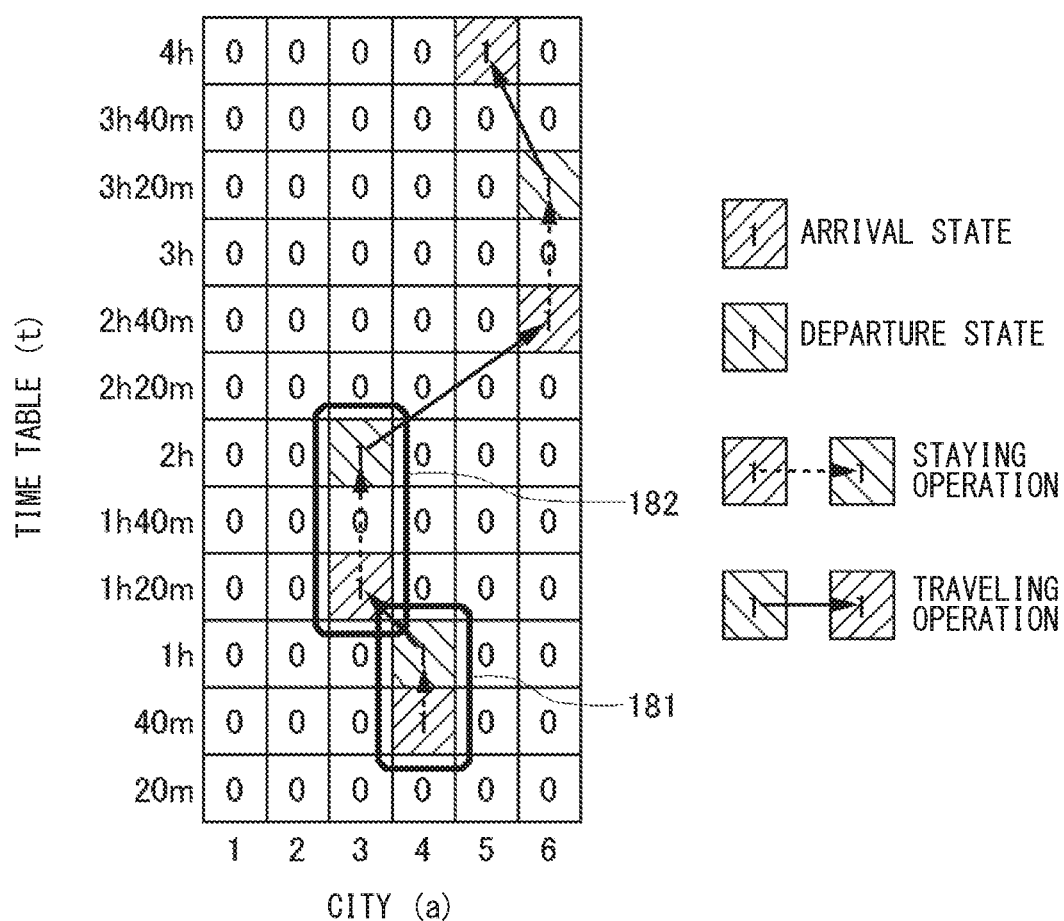
FIG. 18 is a diagram describing an embodiment 9 according to the present embodiment of the present disclosure.

FIG. 18 is a diagram describing an embodiment 9. The embodiment 9 is an example of a stay time setting. The present embodiment is an example in which the capacitated variable of the ising solver is provided by the state variable. Delivery work to each customer and staying work such as unloading and assembling should be performed within the designated time of each customer. These can be described by states. As shown in FIG. 18, this can be implemented by introducing two states of an arrival state and a departure state. In the example of FIG. 18, in a time zone 181, this customer is expected to stay for 20 minutes since the customer perform only transportation and announcement of sales advertisement. In a time zone 182, the customer is expected to stay for 40 minutes since the customer performs work such as setting of an air conditioner. In this way, in the present embodiment, it may be possible to set the traveling rule in accordance with the transition between the states.

Embodiment 10

An embodiment 10 is an example of using the embodiments described above in a combined manner. The present embodiment is the example in which the cost of the ising solver depends on the time or the capacitated variable monotonically increasing or decreasing. The present embodiment is also the example in which the number of steps of the ising solver and the cost are generally different. The present embodiment is also the example of a method for setting the allowance to arrive at the city in accordance with the time point of the ising solver or the capacitated variable monotonically increasing or decreasing. The present embodiment is also the example in which the time point of the ising solver or the range of the capacitated variable monotonically increasing or decreasing differs for each vehicle. The present embodiment is also an example of the interaction that generates a tendency to equally distribute the variables with the city to each vehicle in the ising solver.

By adopting the formulation according to the present embodiment, it may be possible to formulate, for example, the delivery that simultaneously satisfies the following constrains (1) to (12) for the delivery of the packages by the multiple vehicles or the multiple trucks.

(1) One of the constrains is to schedule 3 hours from 9 am to 12 am every 20 minutes (total 9 cells) for optimization.

(2) One of the constrains is to perform delivery destination distribution with an average delivery time of 50 km/h and an average required time of 40 minutes (maximum number of used cells is 4, minimum number of used cells is 1).

(3) One of the constrains is that the degree of congestion on the road is different in accordance with the delivery time point, and the arrival time is different in accordance with the departure time point.

(4) One of the constrains is that each stay destination must provide the stay time for 10 minutes for unloading.

(5) One of the constrains is to perform delivery to 20 locations in one day by five vehicles (for example, two vehicles and three trucks).

(6) One of the constrains is that the delivery destination has the time zone designation that spans multiple time zones (designation by schedule unit every 20 minutes).

(7) One of the constrains is that the vehicle and truck have the loading capacity and the weight limit, and the limit values differ depending on the vehicle type.

(8) One of the constrains is that, for a part of destinations, the trucks cannot enter the narrow road, and only the vehicle can perform the delivery. Also, a part of packages exceeds the loading capacity or the capacity limit, and only the truck can perform the delivery.

(9) One of the constrains is that a part of trucks simultaneously performs the delivery and the pickup. Particularly, for the pickup, it may be necessary to secure the space for the pickup by performing the appropriate delivery and not to exceed the loading limit.

(10) One of the constraints is that a part of the working time of the driver is shorter than the normal working time (for example, working time only from 10 am or the like).

(11) One of the constraints is to take a break for 20 minutes within 3 hours in the morning. What time the driver wants to take a break depends on the driver's declaration system. The time differs for each driver. This is input as the consumption cell number by adding the rest time to the traveling time across the declared time zone.

(12) One of the constraints is that a part of the packages is delivered by a refrigerated delivery, and therefore is relatively prioritized to be delivered even when a certain degree of detour is required.

According to the present embodiment, it may be possible to simultaneously formulate these constraints by using the QUBO format.

Embodiment 11

Figure 19:
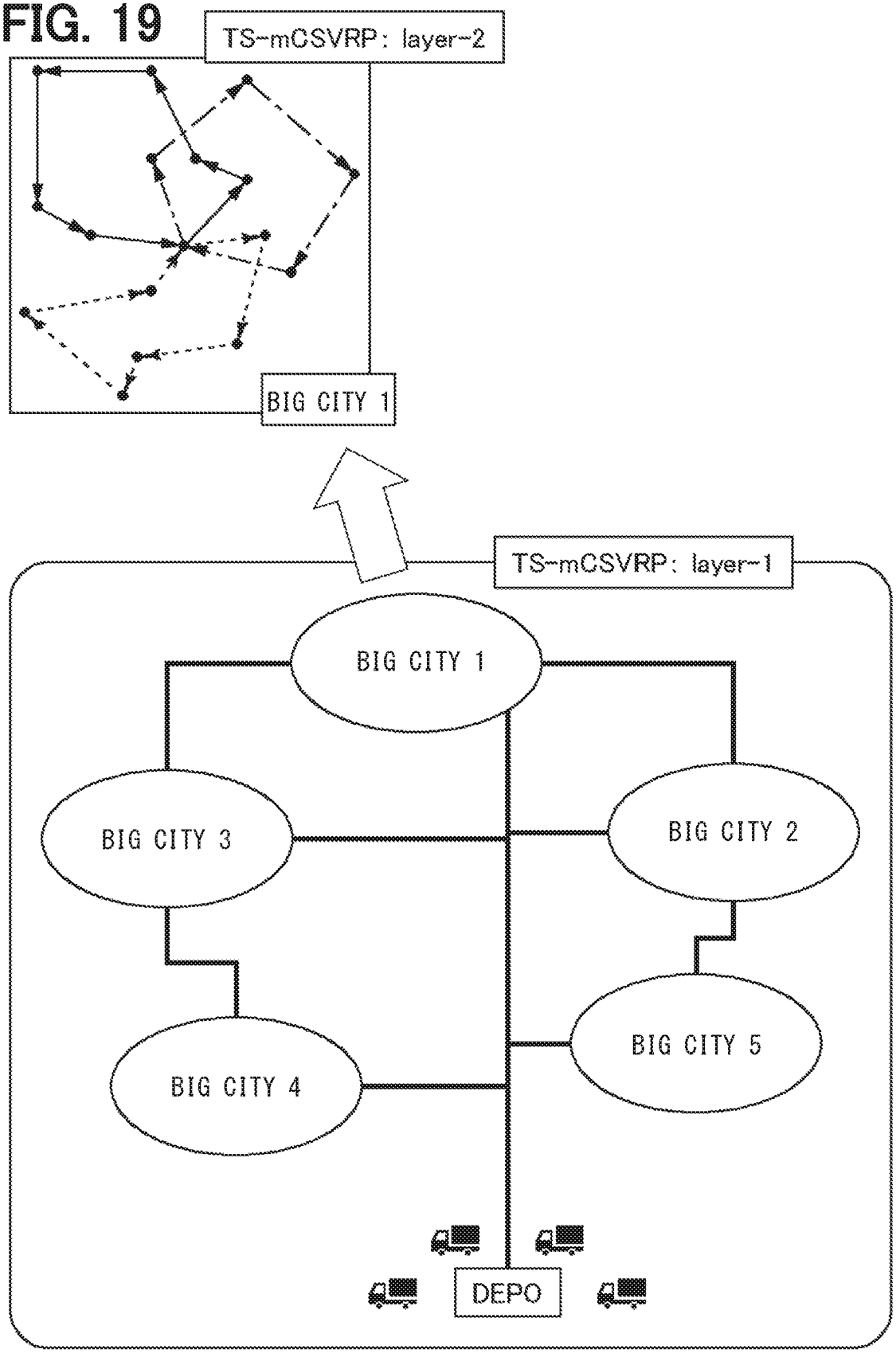
FIG. 19 is a diagram describing an embodiment 11 according to the present embodiment of the present disclosure.

FIG. 19 is a diagram describing an embodiment 11. The embodiment 11 is an example of the multi-step solution to a large-scale problem. As shown in FIG. 19, it may be possible to perform the multi-step solution of CVRP by combining the packages delivered in each large city into one package.

Embodiment 12

Figure 20:
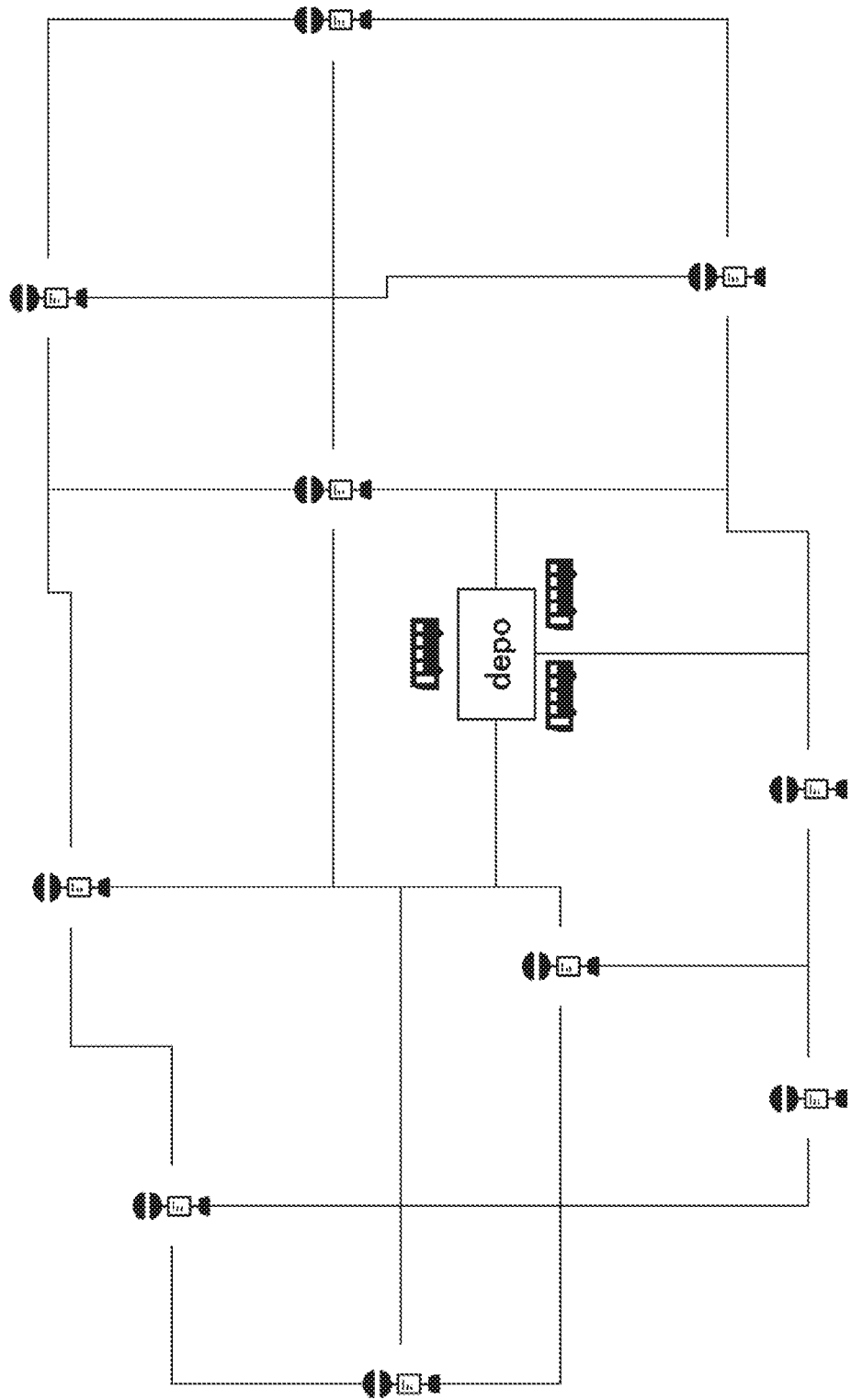
FIG. 20 is a diagram describing an embodiment 12 according to the present embodiment of the present disclosure.

FIG. 20 is a diagram describing an embodiment 12. The embodiment 12 is an example of searching the shortest route. In the shortest route, while multiple buses visit multiple bus stops and each bus may visit the bus stop that another bus visits, the multiple buses are not allowed to arrive at the same time point. The present embodiment is also the example in which the multiple vehicles do not visit the same city when the time points of the ising solver or the capacitated variables monotonically increasing or decreasing are in the same range. The present embodiment is an example of a method of setting a city at which the vehicle cannot arrive as a method of adding an inter-city dependent interaction of the ising solver. The city at which the vehicle cannot arrive may be also referred to as a city that cannot be reached.

First, the schedule for the travel within 30 minutes is optimized at 2-minute intervals (15 cells in total). The bus travels at an average speed of 36 km/h, and travels for an average time of 4 minutes (maximum cell number is 4, at least 1 cell is used). Although seven locations are travel by three buses, it is not allowed for the multiple buses to arrive at one bus stop at the same time point. The bus stops at the bus stop on the route where the bus travels. That is, the bus stop that the bus visits from the different bus stop is limited.

In this case, it may be possible to simultaneously perform formulation by adding the following interaction instead of the expression 18 that is the standard constraint expression. That is, as show in the following expression 50, when the vehicle (i) visits the city (a) at the time point (t), the different vehicle (j) does not visit the city (a) at the same time.

$$\lambda \times x_{t,a}^{(i)} x_{t,a}^{(j)} \ (\forall a, \forall i \neq \forall j, \forall t)$$ [Expression 50]

Elimination is uniformly performed by the penalty term of the number of required cells. Thereby, it may be possible to forbid the travel between the unreachable cities.

Embodiment 13

Figure 21:
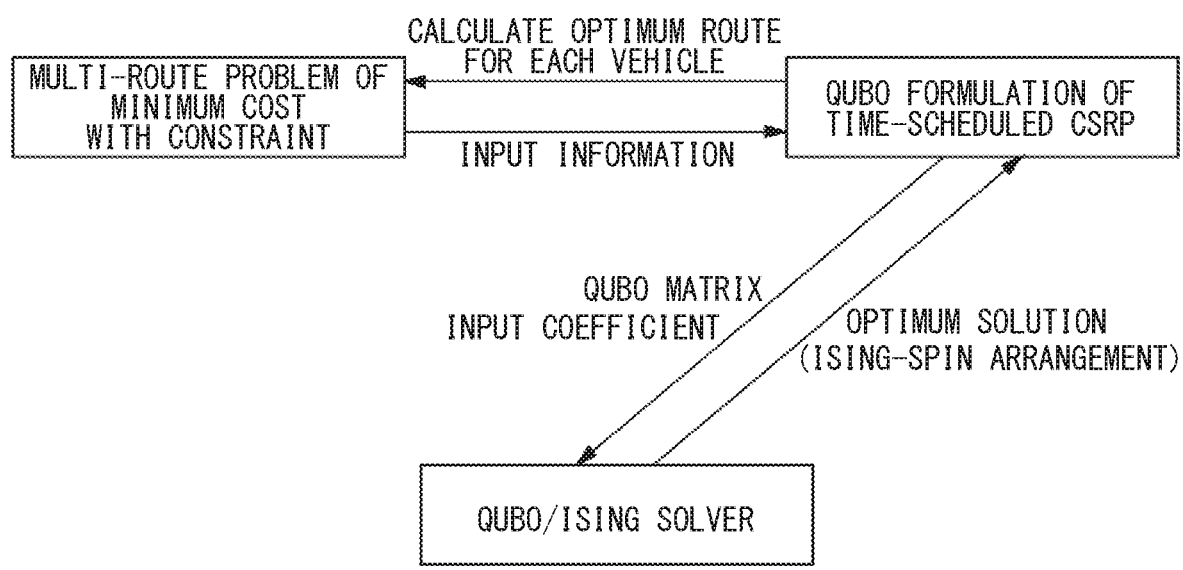
FIG. 21 is a diagram describing an embodiment 13 according to the present embodiment of the present disclosure.

FIG. 21 is a diagram describing an embodiment 13. The embodiment 13 is an example of a TS-mCSVRP optimization solver system. By inputting information to a multi-route problem with the minimum cost and the constraint, the QUBO formulation of the time-scheduled CSVRP according to the present embodiment is implemented. It may be possible to calculate various optimum routes. This input information is various information described above, and includes, for example, the followings.

(1) Calculation cost information when traveling to the delivery destination (city) at each time point.

$$(d_{ab}^{(t)}) 1 \leq a \neq b \leq N$$ [Expression 51]

(2) Consumption time (cell) information when traveling to the delivery destination (city) at each time point.

$$(n_{ab}^{(t)}) 1 \leq a, b \leq N$$ [Expression 52]

(3) Information of the capacity and the weight of the package to be delivered or picked up.

$$(B_{ab|m}^{(t)}) 1 \leq a, b \leq N$$ [Expression 53]

(4) Limit information of the capacity and the weight of the delivery vehicle.

$$q_m^{(i)} \leq c_m^{(i)} \leq Q_m^{(i)}$$ [Expression 54]

(5) Delivery designation time information, driver working time information, information of the delivery vehicle type and the vehicle.

$$x_{t,a}^{(i)} = 0$$ [Expression 55]

In the QUBO formulation of the time-scheduled CSVRP according to the present embodiment, the coefficient of the QUBO matrix is input to the QUBO/ising solver. Thereby, a high speed optimization is performed by a quantum physical machine or a classical ising solver, and it may be possible to obtain the optimal solution (ising spin arrangement). In this way, the embodiment 13 is a system in which the information of the multi-route problem is input to the coefficient of the QUBO problem and the optimal solution is calculated by the ising type solver.

INDUSTRIAL APPLICABILITY

As described above, the present disclosure has an effect of estimating the optimum route including the detour route for the multiple mobile objects, and is useful as a route estimation system or the like.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A route search system comprising:
   a plurality of vehicles each of which travels through a plurality of locations; and
   a computer programmed to calculate an optimal route for the vehicles by executing an Ising Algorithm using a Hamiltonian, wherein
   the Hamiltonian includes a plurality of interaction terms representing an interaction between a plurality of variables of Quadratic Unconstrained Binary Optimization (QUBO),
   the interaction depends on a relation between a departure location and an arrival location,
   the Hamiltonian includes (a) a concept of a location-to-location travel step number of the Ising Algorithm or (b) a capacitated variable of the Ising Algorithm,
   the capacitated variable corresponds to one of the variables of the QUBO and includes a variable constraint,
   the location-to-location travel step number corresponds to an accumulated movement time of each vehicle of the plurality of vehicles, and
   the computer is programmed to
      generate a traveling schedule based on the calculated optimal route, and
      present the generated traveling schedule or control traveling of the each vehicle of the plurality of vehicles based on the generated traveling schedule.

2. The route search system according to claim 1, wherein:
   the capacitated variable of the Ising Algorithm includes a point in time.

3. The route search system according to claim 1, wherein:
   the capacitated variable of the Ising Algorithm monotonically increases or decreases.

4. The route search system according to claim 1, wherein:
   the capacitated variable of the Ising Algorithm is associated with an arrival location and is able to change positively or negatively.

5. The route search system according to claim 1, wherein:
   in the Ising Algorithm, the capacitated variable allowed to vary positively or negatively includes a state variable.

6. The route search system according to claim 1, wherein:
   the capacitated variable of the Ising Algorithm includes a point in time; and
   the capacitated variable of the Ising Algorithm includes addition of positive change or negative change of a capacity associated with an arrival location and a state variable.

7. The route search system according to claim 1, wherein:
   the capacitated variable of the Ising Algorithm monotonically increases or decreases; and
   the capacitated variable capable of increasing or decreasing includes a state variable.

8. The route search system according to claim 1, wherein:
a location that is not reachable is set by introducing the interaction.

9. The route search system according to claim 1, wherein:
a basic constraint and a parameter are set by introducing the interaction.

10. The route search system according to claim 1, wherein:
a cost of the Ising Algorithm depends on a time point or the capacitated variable that monotonically increases or decreases.

11. The route search system ising solver system according to claim 1, wherein:
a schedule time unit in a timetable of the Ising Algorithm has a time point dependency.

12. The route search system according to claim 1, wherein:
a schedule time unit in a timetable of the Ising Algorithm has a vehicle type dependency.

13. The route search system according to claim 1, wherein:
the capacitated variable of the Ising Algorithm is different from a cost.

14. The route search system according to claim 1, wherein:
an arrival allowance to at least one of the plurality of locations is set in accordance with a time point or the capacitated variable that monotonically increases or decreases.

15. The route search system according to claim 1, wherein:
a range of a time point of the Ising Algorithm or a range of a capacity that monotonically increases or decreases differs for each of the plurality of vehicles.

16. The route search system according to claim 1, wherein:
the plurality of vehicles includes a first vehicle and a second vehicle; and
when, in the Ising Algorithm, a time point of the first vehicle or the capacitated variable that is used for the first vehicle and monotonically increases or decreases is in an identical range to a range of the second vehicle, the second vehicle does not visit a location that the first vehicle visits.

17. The route search system according to claim 1, wherein:
in the Ising Algorithm, arrival allowance or arrival rejection of a specific vehicle to the plurality of locations is set.

18. The route search system according to claim 1, wherein:
the interaction includes an interaction that generates a tendency for equally assigning a variable associated with each of the plurality of locations to each vehicle.

19. The route search system according to claim 1, wherein the capacitated variable is at least a loading capacity of the each vehicle.

20. The route search system according to claim 19, wherein the loading capacity is set according to a type of the each vehicle.

21. The route search system according to claim 1, wherein the computer includes:
an input configured to receive input data including at least one of:
(i) cost data indicating a cost caused by the each vehicle of the plurality of vehicles traveling through the plurality of locations,
(ii) traveling time data indicating a time of traveling of the each vehicle of the plurality of vehicles,
(iii) package data indicating size or weight of a package,
(iv) vehicle data indicating at least one of a capacity, a weight, or a vehicle type of the each vehicle of the plurality of vehicles,
(v) limit data indicating at least one of a time limit for delivery, a capacity limit, or a weight limit of the each vehicle of the plurality of vehicles, or
(vi) driver data indicating a work time of a driver for the each vehicle of the plurality of vehicles;
a processor programmed to execute the Ising Algorithm by inputting the input data into the Ising Algorithm; and
an output configured to output the calculated optimal route.

22. The route search system according to claim 1, wherein the computer includes a display screen configured to display the generated traveling schedule.

23. The route search system according to claim 1, wherein the plurality of variables of the QUBO depend on at least:
(1) a variable representing the locations which the each vehicle travels through; and
(2-i) a variable representing an accumulated movement step number of the each vehicle, or
(2-ii) a variable representing an accumulated loading amount of the each vehicle of the plurality of vehicles, and
the plurality of interaction terms of the Hamiltonian include:
a first interaction term between two first variables of the plurality of variables of the QUBO, each of the two first variables representing the departure location or the arrival location, respectively; and
a second interaction term between two second variables of the plurality of variables of the QUBO, each of the second variables corresponding to a total of the location-to-location travel step number or a third interaction term between two third variables of the plurality of variables of the QUBO, each of the third variables corresponding to a loading amount change due to the traveling between one of the locations and another of the locations.

* * * * *